US006511688B2

(12) United States Patent
Edwards et al.

(10) Patent No.: US 6,511,688 B2
(45) Date of Patent: *Jan. 28, 2003

(54) CHEESE PACKAGE, FILM, BAG AND PROCESS FOR PACKAGING A CO₂ RESPIRING FOODSTUFF

(75) Inventors: David Nicholas Edwards, Paris (FR); Stephen James Vicik, Darien, IL (US)

(73) Assignee: Curwood, Inc., Oshkosh, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/950,471

(22) Filed: Sep. 10, 2001

(65) Prior Publication Data

US 2002/0034622 A1 Mar. 21, 2002

Related U.S. Application Data

(60) Division of application No. 08/191,886, filed on Feb. 3, 1994, now Pat. No. 6,316,067, which is a continuation-in-part of application No. 08/044,669, filed on Apr. 9, 1993, now Pat. No. 5,382,470.

(51) Int. Cl.⁷ ................................ A23C 19/16
(52) U.S. Cl. ................ 426/130; 426/36; 428/35.4; 428/526; 428/475.8
(58) Field of Search ................ 428/216, 213, 428/520, 36.6, 36.7, 35.4, 475.8; 426/130, 36, 582

(56) References Cited

U.S. PATENT DOCUMENTS

| | | | |
|---|---|---|---|
| 1,925,443 A | 9/1933 | Gere | 99/116 |
| 2,494,636 A | 1/1950 | Stine | 99/116 |
| 2,813,028 A | 11/1957 | Jackson, Jr. | 99/115 |
| 2,871,126 A | 1/1959 | Smith et al. | 99/116 |
| 3,456,044 A | 7/1969 | Pahlke | 264/25 |
| 3,585,177 A | 6/1971 | Gardner et al. | 260/87 |
| 3,741,253 A | 6/1973 | Brax et al. | 138/137 |
| 4,058,647 A | 11/1977 | Inoue et al. | 428/474 |
| 4,064,296 A | 12/1977 | Bornstein et al. | 428/35 |
| 4,087,587 A | 5/1978 | Shida et al. | 428/500 |
| 4,095,012 A | 6/1978 | Schirmer | 428/474 |
| 4,104,404 A | 8/1978 | Bieler et al. | 428/35 |
| 4,178,401 A | 12/1979 | Weinberg et al. | 428/35 |
| 4,233,367 A | 11/1980 | Ticknor et al. | 428/476 |
| 4,254,169 A | 3/1981 | Schroeder | 428/35 |
| 4,284,674 A | 8/1981 | Sheptak | 428/69 |
| 4,352,844 A | 10/1982 | Bornstein | 428/35 |
| 4,407,897 A | 10/1983 | Farrell et al. | 428/516 |
| 4,410,602 A | 10/1983 | Komoda et al. | 428/516 |
| 4,425,410 A | 1/1984 | Farrell et al. | 428/516 |
| 4,448,792 A | 5/1984 | Schirmer | 426/113 |
| 4,457,960 A | 7/1984 | Newsome | 428/35 |
| 4,495,249 A | 1/1985 | Ohya et al. | 428/516 |
| 4,501,798 A | 2/1985 | Koschak et al. | 428/349 |
| 4,547,433 A | 10/1985 | Ohya et al. | 428/516 |
| 4,552,801 A | 11/1985 | Odorzynski et al. | 428/220 |
| 4,557,780 A | 12/1985 | Newsome et al. | 156/244 |
| 4,561,920 A | 12/1985 | Foster | 156/244 |
| 4,610,914 A | 9/1986 | Newsome | 428/216 |
| 4,615,922 A | 10/1986 | Newsome et al. | 428/35 |

(List continued on next page.)

FOREIGN PATENT DOCUMENTS

| | | |
|---|---|---|
| CA | 743021 | 9/1966 |
| CA | 2050837 | 3/1992 |
| CA | 2053707 | 5/1992 |
| EP | 87080 | 3/1983 |
| EP | 92897 | 11/1983 |
| EP | 120503 | 10/1984 |
| EP | 141555 | 5/1985 |
| EP | 217596 | 4/1987 |
| EP | 236099 | 9/1987 |
| EP | 346944 | 12/1989 |
| EP | 457598 | 11/1991 |
| EP | 530539 | 3/1993 |
| EP | 530549 | 3/1993 |
| EP | 561428 | 9/1993 |
| GB | 1384791 | 2/1973 |

OTHER PUBLICATIONS

"Capron Nylon Resins For Films", 16 pages of Technical Data Sheets from Allied Signal, Inc. (SFF–08) (Feb. 19).
"EVAL Resins", 8 page brochure form EVAL Company of America Lisle, IL (available at least as early as 1992).
"EVAL Ethylene Vinyl Alcohol Copolymor Resins" 5 page brochure from EVAL Company of America Lisle, IL (available as early as 1992).
Technical Bulletins No. 110, 120, 160 and 200 from EVAL Company of America (available at least as early as 1992).
"Le fromage: tout un art aujord hui" (english translation provided "Cheese State of the Art"), (16 page brochure from Cryovac Division of W.R. Grace & Co., available at least as early as 1993).
"Montaflex ® C Peliculas coextruidas de multiples capas." (english translation provided "Montaflex @ C Multiple Layer Coextruded Film") 2 page brochure from Montana Grafia C.A. available at least as early as 1993).
"Perflex® Brier Bags for Natural Cheese", 4 page brochure from Viskase Corp. dated 1991.
R.L. DeMorest, "Specifying Barrier Measurement Systems For Permeable Packages" Packaging Technology & Engineering, vol. 2. No. 3, pp. 40–43, 47 (Aug. 1993).
"Plexar PX 360", 2 page brochure from Quantum Chemical Corp. (1992).
"Capron Nylon Resin for Films Operating Manual", 24 pages from Allied Signals, Inc. (SFF–08) (Feb. 19).

Primary Examiner—D. Lawrence Tarazano
(74) Attorney, Agent, or Firm—Cedric M. Richeson

(57) ABSTRACT

A packaged article, especially a respiring foodstuff such as cheese which generates or releases gas during storage, and a permeable multilayer biaxially oriented film suitable for allowing escape of such gas while minimizing transfer of oxygen across the film which has a thin layer of a blend of EVOH and nylon. In a preferred embodiment the low cost film having a high permeability to $CO_2$ and low $O_2$ permeability is used to package cheese.

35 Claims, No Drawings

U.S. PATENT DOCUMENTS

| | | | |
|---|---|---|---|
| 4,615,926 A | 10/1986 | Hsu et al. | 428/35 |
| 4,640,856 A | 2/1987 | Ferguson et al. | 428/36 |
| 4,647,483 A | 3/1987 | Tse et al. | 428/35 |
| 4,683,170 A | 7/1987 | Tse et al. | 428/349 |
| 4,719,153 A | 1/1988 | Akasawa et al. | 428/515 |
| 4,724,185 A | 2/1988 | Shah | 428/339 |
| 4,726,984 A | 2/1988 | Shah | 428/216 |
| 4,734,327 A | 3/1988 | Vicik | 428/332 |
| 4,737,391 A | 4/1988 | Lustig et al. | 428/35 |
| 4,753,700 A | 6/1988 | Fant | 264/514 |
| 4,755,419 A | 7/1988 | Shah | 428/476 |
| 4,758,463 A | 7/1988 | Vicik et al. | 428/216 |
| 4,770,944 A | 9/1988 | Farrell et al. | 428/474 |
| 4,816,342 A | 3/1989 | Farrell et al. | 428/475 |
| 4,828,915 A | 5/1989 | Schroeder et al. | 428/332 |
| 4,839,235 A | 6/1989 | Shah | 128/516 |
| 4,851,290 A | 7/1989 | Vicik | 428/334 |
| 4,857,399 A | 8/1989 | Vicik | 428/332 |
| 4,857,408 A | 8/1989 | Vicik | 428/474 |
| 4,863,769 A | 9/1989 | Lustig et al. | 428/34 |
| 4,939,076 A | 7/1990 | Mueller | 428/476 |
| 4,952,628 A | 8/1990 | Blatz | 525/58 |
| 4,963,427 A | 10/1990 | Botto et al. | 428/215 |
| 4,999,229 A | 3/1991 | Moritan et al. | 428/36 |
| 5,004,647 A | 4/1991 | Shah | 428/349 |
| 5,075,143 A | 12/1991 | Bekele | 428/36 |
| 5,165,988 A | 11/1992 | Schaefer | 428/220 |
| 5,219,929 A | 6/1993 | Miuashia et al. | 525/57 |
| 5,318,829 A | 6/1994 | Tada et al. | 428/213 |
| 5,322,720 A | 6/1994 | McMurtie et al. | 428/349 |
| 6,063,417 A | 5/2000 | Paleari et al. | 426/127 |
| 6,224,956 B1 | 5/2001 | Shah | 428/36.6 |
| 6,316,067 B1 * | 11/2001 | Edwards et al. | 264/173.15 |

* cited by examiner

US 6,511,688 B2

CHEESE PACKAGE, FILM, BAG AND PROCESS FOR PACKAGING A CO$_2$ RESPIRING FOODSTUFF

CROSS-REFERENCE TO RELATED APPLICATION

This application is a division of application Ser. No. 08/191,886 filed on Feb. 3, 1994 now U.S. Pat. No. 6,316, 067, which is a Continuation-In-Part of application Ser. No. 08/044,669, filed Apr. 9, 1993 now U.S. Pat. No. 5,382,470.

BACKGROUND OF THE INVENTION

The present invention relates to packaged respiring foodstuffs and improvements in the art of packaging foodstuffs which produce gas, particularly $CO_2$ respiring foodstuffs, especially cheeses such as for example emmental, gouda and edam.

Many hundreds of different kinds of cheese are made today. The cheese making art is very old with evidence of cheese making as far back as 2300 B.C. Cheese is a cultured milk product i.e. typically a starter culture of bacteria which produce lactic acid as added to milk along with an enzyme called "rennin". Rennin typically comes from rennet from the stomach of a calf or lamb, but may be derived from either animal or plant sources. The acid produced by the bacteria alters the pH of the milk to an acidity which causes a milk protein termed "casein" to coagulate thereby forming curds. Rennin is an enzyme which facilitates curd formation. Typically, both acid produced by bacteria and rennin are used together to form cheese curds and whey. Curds aggregate holding fat and whey in a network of protein. In cheese making this curd formation is usually followed by pouring off the whey and concentration of the curds. To remove additional whey, curds may be cut, pressed, cooked and/or salted to produce what is termed "green" or unripened cheese. Here "green" refers to the youth or lack of aging of the cheese at this point in manufacture. The green cheese may then be aged or ripened for anywhere from a few days to up to four years or more depending upon the cheese variety. This ripening may continue even after packaging, but is generally slowed by holding cheese at lower refrigeration temperatures.

The above description relates to generally known processes for making natural cheeses. Also known are "processed" cheeses which are ground natural cheeses which typically mix unripened and ripened cheeses with other ingredients such as added milk and stabilizers followed by pasteurization and usually packaging while hot.

In forming natural cheeses, specific molds or bacteria may be added just prior to or during ripening to produce particular varieties of cheese having different characteristics such as flavors, aromas, textures and appearance.

For example, blue cheeses are made by inserting a blue green mold, *Penicillium roquefort* into the interior of the cheese. There are also surface ripened cheeses such as brie and camembert which have an exterior surface coat of a white mold *Penicillium camembert*. Cheeses such as brick and limburger are ripened by bacteria which are coated on the surface of the cheese. The original starter culture bacteria also may provide distinctive characteristics for ripening. Bacteria added in the starter culture is used for ripening in production of hard and semi-hard cheeses such as Parmesan, Cheddar and Gouda. Swiss type cheeses may also be ripened using the original starter culture, but typically additional bacteria such as Propionibacter Shermanii is added to form the "eyes" of the cheese. In emmental or swiss-type cheeses these "eyes" are formed as gas pockets of carbon dioxide ($CO_2$) which is given off in large amounts by the bacteria which is nourished by lactic acid (which is produced by other bacteria in the starter culture). On grading of swiss-type cheese, cheese graders (which may be licensed by various governmental entities) consider the amount, size and development of eyes as well as the cheese appearance including uniformity of firmness, and its flavor and aroma, shape, freedom from mold, color, size and saltiness.

After ripening, or after molding and pressing (for starter culture ripened varieties of cheeses), cheeses are coated or packaged to prevent physical damage, moisture loss and spoilage (eg. by mite infestation or growth of undesirable molds or bacteria). Many packaging materials and preventive coatings are in use for contact with cheeses including: fat, cloth, wax, metal foils and plastic films and sheets. Waxes and resins in particular have been used for many years to coat dry, hard or semi-hard cheeses such as cheddar, cheshire, gouda, edam and danbo by dipping the cheese into melted wax. Cheese has also been packaged into polymer film under conditions which allow ripening of the cheese in the package.

In discussing plastic film packaging, various polymer acronyms are used herein and they are listed below. Also, in referring to blends of polymers a colon (:) will be used to indicate that the components to the left and right of the colon are blended. In referring to film structure, a slash "/" will be used to indicate that components to the left and right of the slash are in different layers and the relative position of components in layers may be so indicated by use of the slash to indicate film layer boundaries. Acronyms commonly employed herein include:

PE—Polyethylene (an ethylene homopolymer and/or copolymer of a major portion of ethylene with one or more α-olefins)

EVA—Copolymer of ethylene with vinyl acetate

PVDC—Polyvinylidene chloride (also includes copolymers of vinylidene chloride, especially with vinyl chloride)

EVOH—A saponified or hydrolyzed copolymer of ethylene and vinyl acetate

EAA—Copolymer of ethylene with acrylic acid

Various published patent documents disclose different types of cheese packages, packaging films and processes for packaging.

U.S. Pat. No. 1,925,443 (Gere) discloses flexible wrappers and a process for packaging uncured cheese wherein the cheese ripens or cures in the package. This patent states that "The package must be of moisture-proof and impervious material, and it must be so sealed as to exclude air, but at the same time, it must provide for the escape of excess carbon dioxide evolved in the course of fermentation". Preferred wrappers include "cellulose viscose" or "cellulose acetate" which may subsequently be coated with paraffin. Disadvantageously, manufacture of these films is complex, time consuming and expensive. Also, it is difficult to adjust $CO_2$ permeabilities for use on different cheeses.

U.S. Pat. No. 2,494,636 (Stine) discloses a method of making emmental (swiss) cheese which comprises applying a coat of extensible, flexible, fluid proof sealing material to the exterior surface of the uncured cheese to seal the surface prior to eye development followed by curing under controlled pressure in an expandable mold. Suitable sealing materials are said to be wax, or a wrap of an elastic-flexible material such as cellophane, the inner surface of which may be coated with a flexible and elastic wax. The packaging materials disclosed here have the same disadvantages as described above for those materials disclosed in the Gere patent.

U.S. Pat. No. 2,871,126 (Smith et al.) discloses a method for manufacturing emmental type cheese which is also known as Swiss cheese. This patent refers to use of thermoplastic film as a moisture proof, fluid-proof material for wrapping the cheese after the brine step for curing in molds. A disadvantage of this disclosed film is that the moisture proof wrapper does not have an adjustable $CO_2$ permeability.

U.S. Pat. No. 2,813,028 (Jackson, Jr.) discloses processes for producing Cheddar cheese. In one process green cheddar curd is extruded into preformed wrappers which may be made of cellulose based films such as cellophane, rubber chloride based films or polyvinylidene chloride based films such as saran. It is preferred that the films have the following characteristics:

(1) substantially moisture proof i.e. having relatively low moisture vapor transmission rate to prevent drying out (2) slightly permeable to carbon dioxide to permit normal curing (3) cling or stick to cheese to prevent mold growth (4) slightly extensible to improve cling between wrapper & cheese by overfilling (5) transparent or translucent to improve appearance.

The disclosed films suffer from disadvantageously, controlling $CO_2$ permeability by slightly opening the ends of the package. This removes the physical, moisture and oxygen barrier at those openings thereby subjecting the cheese to the deleterious effects of excessive oxygen, loss of moisture and exposure to the environment.

Canadian Patent Application 2,053,707 (Mueller) discloses laminate films for packaging soft cheeses such as camembert and brie. Known materials for packaging such soft cheese is said to include polyethylenes with and without ethylene vinyl-acetate copolymers, polypropylenes, nylon/polyethylene laminates, and polyester/polyethylene laminates. Oxygen and carbon dioxide transmission rates are said to be "of primary importance in the packaging of many soft cheeses, as well as other foods items which require a packaging material of high gas permeability such as many fruits and vegetables". (See page 1). The disclosed film of Mueller comprises a first film component (which is perforated) laminated to a gas permeable layer which include at least one layer comprising butadiene styrene copolymers. Relative gas and moisture transmission rates are said to be determined by the size and number of perforations in the first layer as well as the thickness and permeability of the second layer.

In the examples, permeabilities of the film of Example 3 are stated as follows:

"The water vapor transmission rate averaged about 2.73 g/100 in$^2$, 24 hr. at 100° F. and 100% RH. The oxygen transmission rate averaged about 4858.9 cm$^3$/m$^2$ atm., 24 hrs. at 73° F. The carbon dioxide transmission rate averaged about 30204.0 cm$^3$/m$^2$, atm., 24 hrs. at 73° F."

These films have a very high permeability to oxygen as well as carbon dioxide and such extremely high oxygen permeability while perhaps suitable for mold cured cheeses is undesirable for hard or semi-hard cheeses such as emmental, Gouda, Edam and the like due to the possibility of facilitating undesirable mold growth.

Canadian Patent Application No. 2,050,837 (Gillio-Tos et al.) discloses polymer mixtures of polyvinylidene chloride and polyethyloxazoline which are purportedly useful in forming monolayer or multilayer films having increased moisture permeability with no substantial change in permeability to oxygen or carbon dioxide. This combination of properties purportedly is "indicative of utility in packaging, for example, medical applications, casings and the curing of non-gassing cheeses such as Parmesan" (page 3, last paragraph). A table shows moisture, oxygen and carbon dioxide permeability rates. These films are made from chlorinated polymers which are increasingly more difficult to dispose of or recycle as further discussed below.

EP 457 598 (Shah et al) discloses a polyamide based multilayer film for packaging cheese. This polyamide film is disclosed as having "an oxygen transmission rate of no more than 500 cc/M$^2$, 24 hrs., atm and a carbon dioxide transmission rate of at least 750 cc/m2, 24 hrs., atm.". Example 5 purportedly discloses a 1 mil (25.4 micron) thick biaxially oriented film having a core layer comprising a blend of about 70% EVOH and about 30% of a polyamide in combination with polypropylene or propylene copolymer based outer layers and this film has a reported shrinkage at 220° F. (104° C.) of 24% in two directions. The core layer is about 14% of the thickness of the film which would be 0.14 mil (3.6 microns). Example 8 purportedly had outer layers of 90% linear medium density polyethylene blended with 10% of an EVA-based masterbatch and a core layer which was a blend of 70% nylon and 30% EVOH, with the core layer comprising 25% of the total film thickness. Disadvantageously, the shrinkage values of this film are achieved at high temperatures with the lowest reported measurement being made at 104° C. as denoted in the Table on page 8, and it is therefore to be expected that the shrinkage values at 90° C. and lower temperatures would disadvantageously be much less. This results in films having high shrinkage only at undesirably high temperatures.

Various monolayer and multilayer thermoplastic films have been commercialized for packaging cheeses. Three to five layer films are common. Typical structures include: EVA/PVDC/EVA, EVA/EVA/PVDC/EVA, Ionomer/EVA/PVDC/EVA, and variations thereof where ethylene based polymers are blended into one or more of the EVA layers. Some cheese packaging films are heat shrinkable at 90° C. and others are not. Some of the nonshrinking films have an oxygen barrier comprising one or more layers of nylon or EVOH or a blend of EVOH with nylon. Such known nonshrinking films include structures of the type EVA:PE/Nylon, EVA: PE/Nylon/EVOH/Nylon/EVA:PE, EVA:PE/PVDC/Nylon, EVA: PE/EVOH/Nylon, and EVA:PE/Nylon/EVA. The known nonshrinking EVOH containing films generally have a relatively thick EVOH containing layer, generally greater than 0.5 mil (12.7 microns).

Of the foregoing nonshrinking films, those containing EVOH have a typical oxygen permeability of less than 10 cm$^3$ per m$^2$ at 1 atm, 0% relative humidity and 23° C. and are considered high barrier films. The terms "barrier" or "barrier layer" as used herein mean a layer of a multilayer film which acts as a physical barrier to gaseous oxygen molecules. Physically, a barrier layer material will reduce the oxygen permeability of a film (used to form the bag) to less than 70 cm$^3$ per square meter in 24 hours at one atmosphere, 73° F. (23° C.) and 0% relative humidity. These values should be measured in accordance with ASTM standard D-1434.

Also known are films suitable for packaging cheese that are heat shrinkable at 90° C. which contain nylon or a blend of EVOH and nylon. Axially stretched, especially biaxially stretched, films which are "heat shrinkable" as that term is used herein have at least 10% unrestrained shrinkage at 90°

C. (10% in both the machine direction (M.D.) and transverse direction (T.D.) for biaxially stretched films). Such known films include structures of the following types: Ionomer/PE/Nylon, Ionomer/EVA/Nylon, EAA/Nylon:EVOH/Ionomer, and PE/EVOH:Nylon/PE. Some of these EVOH containing heat shrinkable films have an oxygen permeability in the high barrier range. A few heat shrinkable, EVOH-containing films have permeabilities which are outside the high barrier range such as e.g. about 30–35 $cm^3/m^2$ or even as high as 150–170 $cm^3/m^2$ at 1 atm, 0% relative humidity and 23° C.

As shown in the present specification, high barrier film (whether shrinkable or not) which are very good oxygen barriers typically also have very low carbon dioxide permeabilities which may be disadvantageously low for packaging respiring articles such as cheeses, particularly hard and semi-hard cheeses. Packaging films which have low permeability to $CO_2$ are subject to pillowing when hermetically sealed around an enclosed respiring article. If the respiration rate of the enclosed article exceeds the $CO_2$ transmission rate for permeating the enclosing film, "pillowing" will occur. Pillowing or "ballooning" refers to the inflation of the sealed film which typically causes the film surface to move away and out of contact with much of the surface of the enclosed article. For such respiring articles as foodstuffs e.g. hard and semi-hard cheeses, it is perceived that some customers view pillowing as a defect and avoid purchase of refrigerated foodstuffs having a pillowed container. Furthermore, it is believed that retention of high concentrations of $CO_2$ about a respiring foodstuff may possibly adversely affect the curing process itself, possibly delaying development of the desirable characteristics of the microbiological processes including e.g. full flavor and aroma development.

Also, the prior art EVOH-containing high permeability cheese films have several disadvantages for packaging respiring cheeses including one or more of the following: undesirably low shrink values particularly at low temperatures e.g. 90° C. or lower, an undesirably narrow heat sealing range, use of expensive resins such as ionomer in the other layers, and poor optical properties such as high haze, low gloss and/or streaks or lines which detract from the film appearance. Furthermore, known EVOH-containing cheese films have a disadvantageously thick EVOH-containing layer which is often 2 to 10 times thicker than the present invention and difficult to process into an oriented film, difficult to make into a heat shrinkable film having high shrinkage values and shrink forces, especially in two directions, and which requires more material which may increase expense.

As shown by the above, many different multilayer film structures have been and continue to be commercially made and used to package cheeses. These structures all suffer from various disadvantages, especially with respect to packaging "respiring" cheeses i.e. those cheeses which give off $CO_2$ gas.

For example, higher levels of $CO_2$ permeabilities with PVDC containing films require that the PVDC layer be heavily plasticized to achieve gas permeability. Such plasticizers may adversely affect other film properties including processability, optical properties, and orientability.

Also, recycling of PVDC polymers is difficult, particularly where the waste polymer is mixed with other polymers having different melting points. Attempts to remelt film containing PVDC frequently results in degradation of the PVDC component.

SUMMARY OF THE INVENTION

It is an object of the invention to provide a multilayer film having a high carbon dioxide permeability and relatively low oxygen permeability which is controlled by a thin core layer.

It is still another object of the invention to provide a film having low permeability to water vapor.

It is another object of the invention to provide a multilayer film containing EVOH and having high shrinkage values at 90° C. or less.

It is a further object of the invention to provide an irradiatively crosslinked, $CO_2$ permeable multilayer film having an EVOH:nylon blend core layer having a broad impulse heat sealing voltage range.

It is yet another object of the invention to provide an EVOH containing multilayer film having good optical properties.

It is a further object of the invention to provide a chlorine-free packaging film.

It is an object of the invention to provide a film for packaging respiring articles, particularly cheeses, which have reduced pillowing of the package after vacuum packaging.

It is another object of the invention to provide a packaged cheese using a multilayer film having a thin oxygen permeability retarding layer which is also permeable to carbon dioxide.

The above and other objects, benefits and advantages of the invention will be apparent from the disclosure below which is exemplary and nonlimiting. It is not necessary that each and every object listed above be found in all embodiments of the invention. It is sufficient that the invention may be usefully employed.

According to the present invention a gas releasing foodstuff especially $CO_2$ respiring cheese, is packaged in a multilayer, thermoplastic, flexible film of at least five layers having a thin core layer (about 0.05 to-0.1 mil (1.7–2.54 microns) which comprises a blend of about 20–70 weight percent nylon and about 30–80% of an ethylene vinyl alcohol copolymer having an ethylene content of about 38 mole percent or higher. Preferably the inventive film will be heat sealable having at least one layer which is crosslinked, preferably by irradiation. In a preferred highly useful embodiment of the invention, the film will be heat shrinkable at temperatures such as 90° C. or lower, and may have shrinkage values in one or both of the MD and TD directions of at least about 20%, and advantageously e.g. for packaging cheese may be at least 30%.

In one embodiment of the invention, a packaged respiring natural cheese such as emmental, Jarlsberg, edamer, butterkase, Gouda or Edam is provided where an EVOH:nylon 6/66 copolymer (here 6/66 is used to denote a copolymer of nylon 6 and nylon 66) blend core layer of the film has the relative amounts of nylon and EVOH adjusted to provide the desired level of $CO_2$ permeability and $O_2$ barrier properties. Such a film need not be perforated, and preferably is unperforated, yet a high level of $CO_2$ permeability may be obtained without perforations.

DETAILED DESCRIPTION OF THE INVENTION

The inventive film, bag, process and package of the present invention may be used as a $CO_2$ permeable, oxygen barrier film for holding a respiring natural cheese during curing or for packaging for sale of such a cheese after the predetermined curing period. After curing of a cheese such as emmental, the cheese which may be a large block of up to forty pounds (18.2 Kg) or more is often cut up into smaller sizes such as 10 or 7 pound (4.5–3.2 Kg) portions or less for sale to commercial establishments such as hotels, restaurants or other institutions or for retail sale through deli counters or to individual consumers. Forty pound (18.2 Kg) blocks of cheese are frequently packaged in thermoplastic bags having a flat width of 18–22 inches (46–56 cm) while smaller weights are typically packaged in bags having a smaller flatwidth e.g. of less than 10 inches (25.4 cm) for weights of 5 pounds (11 Kg) or less. The present invention may be employed as bags in the various typical sizes. By "flatwidth" is meant the transverse width of a flattened tubular film. The flatwidth is also equal to ½ of the circumference of the tubular film.

The invention has particular utility in packaging natural cheese. Cheese as it is produced from milk with curds that are only cut or pressed is said to be natural (as further discussed above) and may be contrasted with "process" cheese which is made from natural cheese e.g. by grinding, heating and pasteurizing natural cheese with additives which may include milk, water, emulsifiers and/or preservatives. Pasteurization stops or inhibits the aging/ripening process which gives off $CO_2$. Therefore, the $CO_2$ permeable films of the instant invention are particularly advantageous for enclosing natural respiring cheeses because the inventive films allowed $CO_2$ to escape by permeation across the film wall. At the same time the present films and bags made therefrom are much less permeable to oxygen and this is an advantage because the presence of large amounts of oxygen is believed to facilitate growth of undesirable molds.

The present invention is particularly well adapted to packaging respiring cheeses, especially cheeses having eyeholes. Eyeholes in cheese are produced by pockets of carbon dioxide ($CO_2$) which is generated by $CO_2$ producing bacteria such as Propionibacter shermanii.

The invention may be suitably employed with hard cheeses including those having eyeholes which are typically round such as Emmental, Jarlsberg, Gruyere, herregaardsost, danbo, asiago, viereckhartkase, bergkase and samsoe, as well as those cheeses which typically have irregular holes such as Cheshire, maribo, svecia and manchego, and those cheeses which generally have no or few holes such as Cheddar, and provolone. The invention may also be suitably employed with semi-hard cheeses including those having small eyeholes such as Gouda, Edam, fontina, raclette and those typically having irregular eyeholes such as trappist, tilsit and havarti, and even those which typically have no holes such as butter cheese (butterkase), cantal, St. Paulin and feta.

Advantageously, the relative amounts of EVOH polymer and nylon polymer may be adjusted according to the present invention to provide films, bags and packages having various permeabilities to gases including $CO_2$. An example of suitable $CO_2$ permeabilities for various cheeses is given in Table A below.

TABLE A

High $CO_2$ Permeability
(400–600 $cm^3/m^2$ at 5° C. and 0% RH per 24 hr at 1 atmosphere)

Emmental (Swiss)
Jarlsberg
herregaaddsost
svecia
maribo
samsoe

TABLE A-continued

Medium $CO_2$ Permeability
(200–400 $cm^3/m^2$ at 5° C. and 0% RH per 24 hr at 1 atmosphere)

raclette
Low $CO_2$ Permeability
(100–200 $cm^3/m^2$ at 5° C. and 0% RH per 24 hr at 1 atmosphere)

Cheddar
Gouda
Edam
edamer
butterkase

Embodiments of the present invention for use in high $CO_2$ permeability applications will generally use a core layer having a greater amount of nylon (>50 to 70%) and lesser amounts of EVOH copolymer (30 to <50%) to produce a film having higher $CO_2$ permeability. The high permeability film will also utilize an EVOH having an ethylene content of about 48 mole percent or higher because EVOH copolymers having lower ethylene contents have been found to produce films which are more gas impermeable. Preferably the oxygen permeabilities of the high $CO_2$ permeability films and bags of the present invention will be less than 800 $cm^3/m^2$ and greater than 500 $cm^3/m^2$ at 24 hours, 1 atmosphere, 0% relative humidity and room temperature (20–23° C.).

Embodiments of the present invention for use in low $CO_2$ permeability applications will generally use a core layer having a greater amount of EVOH (70–80%) and lesser amounts of nylon (20–30%) to produce a film having a low $CO_2$ gas transmitting rate, particularly when using an EVOH copolymer having an ethylene content of about 48 mole percent. However, EVOH copolymers having lower contents of ethylene e.g. of 44 mole % or as low as 38 mole % may be employed to make low $CO_2$ permeability films which are suitable for packaging articles which respire low levels of $CO_2$ such as gouda, edamer, edam, butterkase and cheddar cheeses, by blending lower amounts of EVOH with higher amounts of nylon. The appropriate blend proportions to achieve the desired level of gas permeability may be determined in view of the present specification without undue experimentation. Even these low $CO_2$ permeability films made according to the present invention will have an oxygen permeability of about 40 $cm^3/m^2$ or higher at 24 hours, 1 atmosphere, 0% relative humidity and room temperature, preferably the oxygen transmission rate will be less than about 75 $cm^3/m^2$.

Embodiments of the present invention for use in medium $CO_2$ permeability applications to adjust and control the $CO_2$ permeability of the film to a level between that of high and low $CO_2$ permeable films of the invention will generally use nylon and EVOH in amounts between those used for high and low permeability films i.e. >30–50 nylon blended with 50 to <70% EVOH when using an EVOH having an ethylene content of about 48 mole %. As noted above, use of EVOH resins having a lesser ethylene content e.g. of about 38 mole % or 44 mole % may require additional nylon to achieve the desired permeability. It should be apparent from the above that use of EVOH resins containing an ethylene content greater than 48 mole % may require less nylon to achieve equivalent permeabilities relative to the 48 mole % EVOH blends discussed above. For these medium $CO_2$ permeability films, the oxygen transmission rate is also 40 cm$^3$/m$^2$ or higher at 24 hours, 1 atmosphere, 0% relative humidity and at room temperature (about 20–23° C.).

In addition to changing the proportion of the blended amounts of EVOH and nylon in the core layer to adjust the gas e.g. CO$_2$ permeability of the films of the invention, the thickness of the core layer may also be varied from about 0.05 to about 0.10 mils (1.3–2.54 microns). Also, while it is preferred that the core layer consist essentially of nylon and EVOH, the present invention recognizes the possibility that the other additives including polymers e.g. other nylons may be blended into the core layer to purposefully affect core layer properties such as gas permeability or moisture resistance.

Advantageously, the present invention permits ripening of CO$_2$-producing cheeses in a thermoplastic multilayer film having a thin core layer of a blend of EVOH with nylon with little or no weight loss during ripening. The moisture barrier properties of the film minimize weight loss from moisture permeation through the film after packaging. Films of the present invention having water vapor transmission rates less than 30 grams per square meter per 24 hours at 100° F. (37.8° C.) under ambient pressure at (~1 atmosphere) have been found to have desirably low weight loss from moisture permeation through the film.

Also, the oxygen barrier properties of the inventive film reduces or eliminates losses of cheese caused by scraping off mold from contaminated surfaces before repackaging for retail sale. Product losses and sensory defects due to mite infection and mold growth are also prevented by use of the film according to the present invention. The present invention may be beneficially used as a ripening film particularly for rindless cheese where rinds having surface molds or bacteria to give particular flavor and odor sensory characteristics to the cheese are not employed. The inventive films and bags are particularly useful for packaging cheese, but may also be employed as packaging for a wide variety of food and non food articles.

Some of the benefits of the inventive film include: relatively low permeability to oxygen and water vapor, particularly in combination with higher CO$_2$ permeability; controlled permeability (and high permeability if desired) to carbon dioxide without perforations in the film; resistance to degradation by food acids, salts and fat; high shrinkage values at low temperatures (90° C. or lower); residual shrink force which maintains a low level of oxygen contact with the food surface after opening; good heat sealability especially over a broad voltage range on commercial sealers; low levels of extractables with compliance with governmental regulations for food contact; delamination resistance; low haze; high gloss; easy to remove from an enclosed foodstuff such as cheese; does not impart off tastes or odors to packaged food; good tensile strength; a surface which is printable; and good machinability.

Advantageously, a preferred embodiment of the invention has a high CO$_2$ permeability at 5° C. with relatively low O$_2$ and low water vapor permeabilities in combination with good low temperature (90° C. or less) shrinkage values. In an especially preferred embodiment the inventive film has at least 20% (more preferably about 30% or higher) shrinkage values in at least one direction and preferably two directions at 90° C. or less. Also, preferred films are heat sealable over a broad voltage range, and preferably heat shrinkable at low temperatures in combination with such broad range heat sealability.

The invention in all of its embodiments comprises or utilizes a multilayer thermoplastic polymeric flexible film of 10 mils (254 microns) or less having an unusually thin core layer containing a blend of EVOH and nylon. This EVOH:nylon blend layer controls the gas permeability of the film. Such films will preferably have a thickness of about 2–2.5 mils (50.8–63.5 microns) although suitable films e.g. for packaging foodstuffs as thick as 4 mils (101.6 microns) or as thin as 1 mil (25.4 microns) may be made. Typically films will be between about 1.5–3 mil (38.1–76.2 microns). Especially preferred for use as bags or films for packaging articles including foodstuffs, e.g. cheeses, are films wherein the multilayer film has a thickness of between about 2 to 2.5 mils (50.8–63.5 microns). Such films have good abuse resistance and machinability. Films thinner than 2 mils are more difficult to handle in packaging processes. Advantageously, preferred films are heat shrinkable. Preferred films may also provide a beneficial combination of one or more or all of the properties including high gloss, high shrinkage values at 90° C. or less, good machinability, good mechanical strength and good relatively low oxygen barrier and water barrier properties with desirably high CO$_2$ permeabilities.

The expression "ethylene vinyl acetate copolymer" (EVA) as used herein refers to a copolymer formed from ethylene and vinyl acetate monomers wherein the ethylene derived units (monomer units) in the copolymer are present in major amounts (by weight) and the vinyl acetate derived units (monomer units) in the copolymer are present in minor, by weight, amounts.

The expression very low density polyethylene ("VLDPE") sometimes called ultra low density polyethylene ("ULDPE"), refers to linear polyethylenes having densities below about 0.915 g/cm$^3$ and according to at least one manufacturer, possibly as low as 0.86 g/cm$^3$. This expression does not include ethylene alpha olefin copolymers of densities below about 0.90 g/cm$^3$ with elastomeric properties and referred to as elastomers. Some elastomers are also referred to by at least one manufacturer as "ethylene alpha olefin plastomers", but other manufacturers have characterized VLDPE as an ethylene α-olefin with plastomeric properties. However, as hereinafter explained, ethylene alpha elastomers or olefin plastomers may be advantageously used in the practice of this invention as a minor constituent in certain layers of this multilayer film. VLDPE does not include linear low density polyethylenes (LLDPE) which have densities in the range of 0.915–0.930 gm/cm$^3$. VLDPE's as the term is used herein may be made by solution or fluidized bed processes using a variety of catalysts including Ziegler-Natta or metallocene catalysts.

VLDPE comprises copolymers (including terpolymers) of ethylene with alpha-olefins, usually 1-butene, 1-hexene or 1-octene, and in some instances terpolymers, as for example of ethylene, 1-butene and 1-hexene. A process for making VLDPEs is described in European Patent Document publication number 120,503 whose text and drawing are hereby incorporated by reference into the present document.

As for example described in Ferguson et al. U.S. Pat. No. 4,640,856 and Lustig et al. U.S. Pat. No. 4,863,769, VLDPEs are capable of use in biaxially oriented films and have superior properties to comparably made films having LLDPEs. These superior properties include higher shrink, higher tensile strength and greater puncture resistance.

Suitable VLDPEs include those manufactured by Dow Chemical Company, Exxon Chemical Company and Union Carbide Corporation.

EVOH is prepared by the hydrolysis (or saponification) of an ethylene-vinyl acetate copolymer, and it is well known that to be an effective oxygen barrier, the hydrolysis-saponification must be nearly complete, ie. to the extent of at least 97%. EVOH is commercially available in resin form with various percentages of ethylene and there is a direct relationship between ethylene content and melting point.

In the practice of this invention, the EVOH component of the core layer has a melting point of about 175° C. or lower. This is characteristic of EVOH materials having an ethylene content of about 38 mole % or higher. EVOH having an ethylene content of 38 mole % has a melting point of about 175° C. With increasing ethylene content the melting point is lowered. Also, EVOH polymers having increasing mole percentages of ethylene have greater gas permeabilities. A melting point of about 158° C. corresponds to an ethylene content of 48 mole %. Preferred EVOH materials will have an ethylene content of 48 mole %. EVOH copolymers having higher ethylene contents may be employed and it is expected that processability and orientation would be facilitated, however gas permeabilities, particularly with respect to oxygen may become undesirably high for certain packaging applications which are sensitive to mold growth in the presence of oxygen.

It has been discovered that the inventive film with all of its advantages can only employ nylon 6/66 as the polyamide in the polymer blend of the oxygen barrier layer. Nylon 6/66 is a copolymer of nylon 6 and nylon 66. Nylon 6 is polyepsilon caprolactam. Nylon 66 is the polymer derived from adipic acid and hexamethylene diamine.

Nylon 6/66 is manufactured by different companies, in some instances with different percentages of the two monomers, possibly by different methods and presumably with different operating parameters. Accordingly, the properties of various nylon 6/66 copolymers may differ significantly. For example, the melting temperature decreases as the nylon 66 content is increased from 5% to 20 mole %.

When other nylons such as type 6,12 are used as the polyamide in the polymer blend of the oxygen barrier layer, numerous gels develop in the core layer of the five layer film and in some instances cracks develop. The gels may be due to EVOH-nylon 6,12 incompatibility or chemical reaction between the two polymers. The cracks probably develop because the polymer blend is not stretching uniformly during the orientation. These numerous gels and cracks are unacceptable in films for commercial use to package foodstuffs and indicate potential weak spots in the film integrity and permeability properties.

A preferred nylon is a nylon 6/66 copolymer having a melting point of about 195° C., which has a reported nylon 6 component content of about 85 mole % and a nylon 66 component content of about 15 mole % and which is commercially available from Allied Chemical Co. of Morristown, N.J., U.S.A. under the trademark Nylon 1539.

It has been discovered that a workable film may be obtained by substituting nylon 11 (poly ω-aminoundecanoic acid) for the nylon 6/66 copolymers in the present invention. Such film has many of the advantages of the present invention including good low temperature shrink values and desirable $CO_2$ and $O_2$ permeabilities, but the optical properties are not as excellent and noticeable lines may appear in the film, notwithstanding desirably low haze and high gloss values.

Advantageously, films of the present invention may have low haze e.g. less than 10 and preferably less than 5%, and high gloss e.g. greater than 65 Hunter Units (H.U.) and preferably greater than 75 H.U.

The inventive article is preferably a heat shrinkable multilayer film which must have at least five layers. These five essential layers are termed the first outer layer, the first adhesive layer, the core layer, the second adhesive layer, and the second outer layer. The first outer layer and second outer layer are disposed on opposing sides of the core layer and are attached thereto by the first and second adhesive layers, respectively. These five layers are essential to the film of this invention. When the film is in tube or bag form these layers comprise the wall of the tube or bag. This wall in cross-section has the first outer layer comprising an inner layer disposed closest to the tube's (or bag's) interior surface with the second outer layer disposed closest to the tube's (or bag's) exterior surface.

It is contemplated according to the present invention that tubular films having more than five layers may be constructed and that such additional layers may be disposed as additional intermediate layers lying between the core layer and either or both of the inner and outer layers, or these additional layers may comprise one or more surface layers and comprise either or both the interior or exterior surface of the tube. Preferably, the first outer layer will comprise the inner or interior surface layer of the tube where in use it will contact a foodstuff encased by the tube. Beneficially, this first outer layer will be heat sealable to facilitate formation of bags and hermetically sealed packages. Advantageously, the first outer layer as the interior or inner surface layer will, when used to package foodstuffs, be suitable for contact with foodstuffs containing protein, water and fat without evolving or imparting harmful materials, off tastes or odors to the foodstuff. In a preferred embodiment, the invention provides a film suitable for packaging cheeses, particularly cheeses which give off carbon dioxide gas (also termed "respiring") while packaged, such as Emmental (swiss), Gouda or Edam. Beneficially, in the present invention the first outer layer may be the interior surface layer and may consist essentially of an ethylene vinyl acetate copolymer such as an EVA having about 10.5% by weight of vinyl acetate (10.5% VA) which facilitates orientation to produce a film having high shrinkage values especially at 90° C. or lower (e.g. 85° C. or 80° C.). Advantageously, the heat sealing layer and indeed the entire film may be free of ionomer polymer yet provide entirely satisfactory performance without the added expense of using costly ionomer resin. If desired, an ionomeric resin may be used either alone or blended in one or more of the layers but such use is unnecessary to produce a film suitable for packaging respiring cheeses.

Also, it is preferred that the second outer layer will comprise the exterior surface of the tube or bag. As the exterior surface layer of the tube or bag, the outer layer should be resistant to abrasions, abuse and stresses caused by handling and it should further be easy to machine (i.e. be easy to feed through and be manipulated by machines e.g. for conveying, packaging, printing or as part of the film or bag manufacturing process). It should also facilitate stretch orientation where a high shrinkage film is desired, particularly at low temperatures such as 90° C. and lower.

Advantageously, either or both of the first and second outer layers may be predominantly comprised of ethylene homopolymers or copolymers having at least 50% or higher ethylene content and may also be free of polypropylene or propylene copolymers having a propylene content of 50% or more, and films made with such outer layers according to the present invention may be oriented either uniaxially or biaxially by axial stretching at temperatures low enough to produce low temperature high shrink films. Such heat shrinkable films will have at least 10% shrink in at least one direction at 90° C., but preferably will have at least 20% shrink at 90° C. in at least one direction (preferably both directions) and advantageously may have at least 30% shrink at 90° C. in at least one direction, but preferably both M.D. and T.D. directions, and beneficially may have at least 15% (more preferably at least about 20%) shrink at 80° C. in at least one and preferably both M.D. and T.D. directions. The outer layers function to protect the core layer from abuse and may also protect it from contact with moisture which may impact or alter the gas barrier properties of the core layer EVOH and/or nylon.

Beneficially, in the present invention there are intermediate adhesive layers on either side of the core layer with these intermediate adhesive layers adhering the core layer to both the inner and outer layers. In a preferred embodiment the EVOH:nylon blend core layer directly adheres to the first and second adhesive layers which in turn are directly adhered respectively to the inner and outer layers. In a most preferred embodiment the film article consists essentially of five polymeric layers viz the inner layer, the first adhesive layer, the core layer, the second adhesive layer and the outer layer. This preferred embodiment provides a desirable combination of properties such as low moisture permeability, relatively low $O_2$ permeability in combination with relatively high $CO_2$ permeability, high gloss, good mechanical strength, chlorine-free construction, and desirable shrink forces in a low temperature heat shrinkable, multilayer packaging film which is delamination resistant and can be oriented without requiring addition of processing aids or plasticizers to the EVOH:nylon core layer. Preferably the core layer will be free of such processing aids or plasticizers.

Typical layer thicknesses for the inventive heat shrinkable film may be about 5–70% first outer (or inner) layer, 2–10% first adhesive layer, 2–10% core layer, 2–10% second adhesive layer and 20–35% second outer layer, although films with differing layer ratio thicknesses are possible. The function of the first outer layer (which is typically the inner layer in a tubular construction) is to provide a layer which has high shrinkage capability and a surface which is heat sealable to itself (or to the second outer layer where a lap seal is desired) on commercially available equipment and (for food packaging) to provide a hygienic surface for contact with the foodstuff which is typically a cheese, such as a semi-soft or semi-hard or hard cheese and especially a $CO_2$ respiring cheese such as Edam, Gouda or Emmental (Swiss). In the present invention, to fulfill the second and third functions the thickness of the inner layer need not be great, but for shrinkability and ease of processing this layer will preferably be the thickest of the layers and in a preferred embodiment the major thickness (>50%) of the entire film. Alternatively, another layer may be the shrink controlling layer or a shrink controlling layer may be added on either side of the core layer. In such alternative embodiments the first outer layer for sealing and food contact may be made very thin i.e. 5% or less of the total thickness. It is important that this heat sealable layer be continuous, e.g. over the inner surface of the tube, and that it be extruded at a sufficient thickness to allow heat sealing (if desired) as well as being thick enough to accommodate the desired degree of stretching without bursting or failure.

Preferably, the first outer layer is a heat sealing layer which allows the film to be formed into bags. By the term "heat sealing layer" is meant a layer which is heat sealable to itself, i.e., capable of fusion bonding by conventional indirect heating means which generate sufficient heat on at least one film contact surface for conduction to the contiguous film contact surface and formation of a bond interface therebetween without loss of the film integrity. Advantageously, the bond interface must be sufficiently thermally stable to prevent gas or liquid leakage therethrough when exposed to above or below ambient temperatures during processing of food within the tube when sealed at both ends, i.e., in a sealed bag form. Finally, the bond interface between contiguous inner layers must have sufficient physical strength to withstand the tension resulting from stretching or shrinking due to the food body sealed within the tube.

The first outer layer especially as the inner layer of a tube according to the present invention also provides good machinability and facilitates passage of the film over equipment (e.g. for inserting foodstuffs such as cheese). This layer may be coated with an anti-block powder. Also, conventional antiblock additives, polymeric plasticizers, or slip agents may be added to the first outer layer of the film or it may be free from such added ingredients. In one embodiment of the invention the first outer layer consists essentially of an EVA copolymer.

Advantageously, the core layer functions as a controlled gas barrier, and provides the desired $CO_2$ and $O_2$ permeabilities for the article (e.g. foodstuff) to be packaged. It should also provide good optical properties when stretch oriented, including low haze and a stretching behavior compatible with the layers around it for ease of orientation. It is essential that the thickness of the core layer be less than about 0.10 mil (2.54 microns) and greater than about 0.05 mil (1.27 microns) to provide the desired combination of the performance properties sought e.g. with respect to carbon dioxide permeability, oxygen permeability, shrinkage values especially at low temperatures, ease of orientation, delamination resistance and cost. Preferably, the thickness of the core layer will also be less than about 5% of the total thickness of the multilayer film suitable thicknesses are less than 10% e.g. from 2 to 10% of the total film thickness.

The core layer must be a blend of EVOH and nylon which contains about 20–70 wt. % of nylon and about 30–80 wt. % of EVOH copolymer. Use of lower amounts of nylon (less than 20% and particularly less than 15%) results in a tendency for the core layer to crack (sometimes referred to as "line-drawing") rather than stretch uniformly during orientation. This is in part due to the relatively brittle nature of EVOH polymers compared to e.g. EVAs and PEs. Similarly, at EVOH levels above 80% the tendency for such cracking, and formation of optical defects and potential core layer discontinuities is undesirably greater. At EVOH levels below 30% the oxygen gas permeability of the film tends to become undesirably excessive which may lead to an enhanced probability of mold growth due to increased oxygen permeability e.g. on cheeses packaged in a film of such construction. Preferably a high to medium high $CO_2$ permeable film will have an EVOH:nylon content between about 30:70 percent and 60:40 percent while a medium low to low $CO_2$ permeable film will have an EVOH:nylon content of between about 60:40 percent and 80:20 percent.

The outer layer provides mechanical strength, abrasion resistance and resists burn through during heat sealing. This outer layer is typically sufficiently thick to provide support and impart strength to the packaging film wall in order to withstand the shrinking operation, handling pressures, abrasion, and packaging with a foodstuff such as cheese. Advantageously, it may comprise a polyethylene i.e. an ethylene homopolymer or a copolymer of ethylene with a minor proportion of one or more alpha-olefins, which may provide a water vapor barrier which resists moisture permeation. High moisture barrier properties are desirable to avoid weight loss and undesirable drying of the cheese which may deleteriously affect the desired cheese sensory properties including texture, mouth feel, taste and appearance.

The multilayer film of the invention may be made by conventional processes including e.g. slot cast or blown film processes, but preferably will be made by an orientation process, especially under conditions to produce a film which is heat shrinkable at 90° C. or less. Nonshrink films according to the present invention may be used as overwraps, stretch wraps or as industrial plastic wrap. Shrink films according to the present invention may be used in value added applications. For example, a packaged foodstuff such as cheese having a heat shrinkable film enclosure according to the invention will advantageously cling to the foodstuff even after opening. Non-shrink bags have a tendency to fall away from the sides of the enclosed product (e.g. cheese) once the vacuum is broken by either intentional or accidental opening. Once the film separates from the enclosed article surface, oxygen comes into contact with the article surface and product defects on susceptible products such as growth of undesired mold on cheese may occur. Many prior art films and bags are nonshrink bags which suffer from this defect thereby causing spoilage and waste when used to package perishable foodstuffs such as cheese. Undesired mold is often cut away or scraped from a cheese surface causing product loss. Advantageously, in one preferred embodiment the present invention provides a shrink film which eliminates or minimizes such losses while utilizing film resins of lower cost than some prior art multilayer shrink films which have thick EVOH containing layers and/or utilizing expensive ionomer resins and/or require relatively thick adhesive layers (each intermediate adhesive layer being >10–15% of the total film thickness) on either side of the core layer to orient the film. It should also be noted that resins such as anhydride modified polyolefin are relatively expensive and use of thick adhesive layers undesirably increases the cost of multilayer films.

The five layer film of this invention may be manufactured by coextrusion of all layers simultaneously for example as described in U.S. Pat. No. 4,448,792 (Schirmer) or by a coating lamination procedure such as that described in U.S. Pat. No. 3,741,253 (Brax et al.) to form a relatively thick primary multilayer extrudate either as a flat sheet or, preferably, as a tube. This sheet or tube is oriented by stretching at orientation temperatures which are generally below the melting points for the predominant resin comprising each layer oriented. Stretch orientation may be accomplished by various known methods e.g. tentering which is commonly employed to orient sheets, or by the well-known trapped bubble or double bubble technique for orienting tubes as for example described in U.S. Pat. No. 3,456,044 (Pahlke). In this bubble technique an extruded primary tube leaving a tubular extrusion die is cooled, collapsed and then preferably oriented by reheating and inflating to form an expanded secondary bubble which is again cooled and collapsed. Preferred films are biaxially stretched. Transverse direction (TD) orientation is accomplished by the above noted inflation to radially expand the heated film which is cooled to set the film in an expanded form. Machine direction (MD) orientation is preferably accomplished with the use of sets of nip rolls rotating at different speeds to stretch or draw the film tube in the machine direction thereby causing machine direction elongation which is set by cooling. Orientation may be in either or both directions. Preferably, a primary tube is simultaneously biaxially stretched radially (transversely) and longitudinally (machine direction) to produce a multilayer film which is heat shrinkable at temperatures below the melting points of the major polymeric components, e.g. at 90° C. or lower. Axially stretched, especially biaxially stretched, films which are "heat shrinkable" as that term is used herein have at least 10% unrestrained shrinkage at 90° C. (10% in both the machine direction (M.D.) and transverse direction (T.D.) for biaxially stretched films).

The general annealing process by which biaxially stretched heat shrinkable films are heated under controlled tension to reduce or eliminate shrinkage values is well known in the art. If desired, films of the present invention may be annealed to produce lower shrinkage values as desired for the particular temperature. The stretch ratio during orientation should be sufficient to provide a film with a total thickness of between about 1.5 and 4.0 mils. The MD stretch ratio is typically 3–6 and the TD stretch ratio is also typically 3–6. An overall stretch ratio (MD stretch multiplied by TD stretch) of about 9×–36× is suitable.

The preferred method for forming the multilayer film is coextrusion of the primary tube which is then biaxially oriented in a manner similar to that broadly described in the aforementioned U.S. Pat. No. 3,456,044 where the primary tube leaving the die is inflated by admission of a volume of air, cooled, collapsed, and then preferably oriented by reinflating to form a secondary tube termed a "bubble" with reheating to the film's orientation (draw) temperature range. Machine direction (MD) orientation is produced by pulling or drawing the film tube e.g. by utilizing a pair of rollers traveling at different speeds and transverse direction (TD) orientation is obtained by radial bubble expansion. The oriented film is set by rapid cooling. In the following examples, all five layers were coextruded as a primary tube which was cooled upon exiting the die by spraying with tap water. This primary tube was then reheated by radiant heaters with further heating to the draw temperature (also called the orientation temperature) for biaxial orientation accomplished by an air cushion which was itself heated by transverse flow through a heated porous tube concentrically positioned around the moving primary tube. Cooling was accomplished by means of a concentric air ring.

In a preferred process for making films of the present invention, the resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. However, variations are expected which may depend upon such factors as variation of polymer resin selection, use of other resins e.g. by blending or in separate layers in the multilayer film, the manufacturing process used and particular equipment and other process parameters utilized. Actual process parameters including process temperatures are expected to be set by one skilled in the art without undue experimentation in view of the present disclosure.

As generally recognized in the art, resin properties may be further modified by blending two or more resins together and it is contemplated that various resins may be blended into individual layers of the multilayer film or added as additional layers, such resins include ethylene-unsaturated ester copolymer resins, especially vinyl ester copolymers such as EVAs very low density polyethylene (VLDPE), linear low density polyethylene (LLDPE), low density polyethylene (LDPE), high density polyethylene (HDPE), nylons, ionomers, polypropylene or other esters. These resins and others may be mixed by well known methods using commercially available tumblers, mixers or blenders. Also, if desired, well known additives such as processing aids, slip agents, antiblocking agents, pigments, etc., and mixtures thereof may be incorporated into the film.

In some preferred embodiments of the invention it is preferred to crosslink the entire film to broaden the heat sealing range. This is preferably done by irradiation with an electron beam at dosage levels of at least about 2 megarads (MR) and preferably in the range of 3–5 MR, although higher dosages may be employed. Irradiation may be done on the primary tube or after biaxial orientation. The latter, called post-irradiation, is preferred and described in U.S. Pat. No. 4,737,391 (Lustig et al.). An advantage of post-irradiation is that a relatively thin film is treated instead of the relatively thick primary tube, thereby reducing the power requirement for a given treatment level.

Alternatively, crosslinking may be achieved by addition of a chemical crosslinking agent or by use of irradiation in combination with a crosslinking enhancer added to one or more of the layers, as for example described in U.S. Pat. No. 4,055,328 (Evert et al.). The most commonly used crosslinking enhancers are organic peroxides such as trimethylpropane and trimethylacrylate.

It will be seen from the following description that the five layer film of this invention has a very thin EVOH-nylon blend core layer thickness of between about 0.05 and about 0.1 mil yet provides a controlled carbon dioxide ($CO_2$) permeability of between about 75 to 600 $cm^3/m^2$ measured at 5° C., 0% relative humidity, for 24 hours at 1 atmosphere and relatively low oxygen transmission rate which is preferably less than 800 $cm^3/m^2$ at 23° C. for 24 hours at 1 atmosphere and 0% relative humidity. This has been accomplished with a substantially thinner barrier layer containing the relatively expensive EVOH than heretofore proposed films of this type. Yet the total thickness of the multilayer film is between about 1.0 and about 4.0 mils, the same as the conventional multilayer oxygen-moisture barrier films currently used in cheese packaging. The relative ratio of EVOH to nylon may be modified to select the desired $CO_2$ permeability. Suitable ranges for high $CO_2$ permeable film may range from 30 to 60% EVOH and 40–70% nylon. Suitable ranges for low $CO_2$ permeable films may range from 60 to 80% EVOH and 20–40% nylon. A mid-range of medium permeabilities may be obtained using from about 30–50% nylon and 70–50% EVOH. This multilayer film of the present invention surprisingly has a very thin nylon: EVOH core layer which is between 0.05 to 0.10 mils thick and less than 10% of the total thickness of the multilayer film, which core layer is connected to surface layers on opposing sides by intermediate adhesive layers each preferably having less than 10% of the total film thickness, and this film having these characteristics may surprisingly be made by using a biaxial stretching process such as that disclosed in U.S. Pat. No. 3,456,044 (Pahlke) with optional irradiative crosslinking after stretching.

This EVOH blend core layer will also control the oxygen permeability of the film. For hard or semi-hard respiring cheese packaging, the oxygen ($O_2$) permeability desirably should be minimized. Typical films will have an $O_2$ permeability of less than about 800 $cm^3/m^2$ for a 24 hour period at 1 atmosphere, 0% relative humidity and 23° C., and preferably less than 300 $cm/m^2$. For the blends of the present invention the $O_2$ transmission rate ($O_2$GTR) does increase as the $CO_2$ rate increases although not to the same degree. For the desired $CO_2$ permeabilities it has been found than an $O_2$ transmission rate (permeability) of at least about 40 $cm^3/m^2$ at 24 hours, 1 atmosphere 0% relative humidity and at 23° C. is required, for medium high or higher $CO_2$ permeability the $O_2$GTR will preferably be greater than 75 $cm^3/m^2$ for 24 hours at 1 atmosphere, 0% relative humidity and 23° C., and for high $CO_2$ permeability films the $O_2$ permeability rate will preferably be at least 150 $cm^3/m^2$ or greater.

These former performance levels (<800 $cm^3/m^2$ and <300 $cm^3/m^2$) are desirable for shrink packaging foodstuffs such as cheeses which are susceptible to contamination with undesirable molds which flourish in the presence of oxygen.

The second and third adhesive layers of this film contain the next most expensive components (relative to the EVOH:nylon blend core layer). Advantageously, films according to the present invention, including heat shrinkable films having high shrinkage values may be in which each adhesive layer comprises only between about 2–10%, preferably less than 5%, eg. about 2.5–3.0% of the multilayer film thickness. Use of a 3% adhesive layer directly adhered to either side of the core layer produces a film which is extremely resistant to delamination and which may be oriented to produce film having high shrinkage of 30% or higher at 90° C. or less.

The following are examples and comparative examples given to illustrate the present invention.

Experimental results of the following examples are based on tests similar to the following test methods unless noted otherwise.

Tensile Strength: ASTM D-882, Method A

% Elongation: ASTM D-882. Method A

Haze: ASTM D-1003-52

Gloss: ASTM D-2457, 450 angle

1% Secant Modulus: ASTM D-882, Method A

Oxygen Gas Transmission Rate ($O_2$GTR): ASTM D-3985-81

Water Vapor Transmission Rate (WVTR): ASTM F 1249-90

Elmendorf Tear Strength: ASTM D-1992

Gauge: ASTM D-2103

Melt Index: ASTM D-1238, Condition E (190°)

Melting point: ASTM D-3418, DSC with 5° C./min heating rate

Carbon Dioxide Gas Transmission Rate ($CO_2$GTR): Carbon dioxide gas permeability of film was measured by using an infrared sensor and recorder which is available under the trademark Permatran C-IV by Mocon Testing of Minneapolis, Minn., U.S.A. Each tubular film is cut open to form a flattened sheet. A single thickness of each film sheet is clamped between upper and lower halves of a diffusion cell having dimensions defining a 50 $cm^2$ test area. Carbon dioxide gas (100%) is placed into the upper halve of the diffusion cell. A nitrogen carrier gas, which is free of carbon dioxide, is flushed into the bottom halve of the diffusion cell. This cell is then connected to an infrared sensor and pump creating a closed loop for circulation of the trapped nitrogen carrier gas. The infrared sensor monitors increases in concentration of $CO_2$ as carbon dioxide diffuses through the test film into the closed loop of nitrogen gas, and presents a voltage trace on a strip chart recorder. This trace represents the amount of carbon dioxide diffusing. The carbon dioxide gas transmission rate is derived from the slope of the voltage trace; the instrument having been calibrated by recording voltage changes which correspond to measured amounts of $CO_2$ injected into the instrument.

Shrinkage Values: Shrinkage values are defined to be values obtained by measuring unrestrained shrink at 90° C.

(or the indicated temperature if different) for five seconds. Four test specimens are cut from a given sample of the film to be tested. The specimens are cut into squares of 10 cm length in the machine direction by 10 cm. length in the transverse direction. Each specimen is completely immersed for 5 seconds in a 90° C. (or the indicated temperature if different) water bath (or silicone oil if the test temperature is greater than 100° C.). The specimen is then removed from the bath and the distance between the ends of the shrunken specimen is measured for both the M.D. and T.D. directions. The difference in the measured distance for the shrunken specimen and the original 10 cm. side is multiplied by ten to obtain the percent of shrinkage for the specimen in each direction. The shrinkage for the four specimens is averaged for the M.D. shrinkage value of the given film sample, and the shrinkage for the four specimens is averaged for the TD shrinkage value.

Shrink Force: The shrink force of a film is that force or stress required to prevent shrinkage of the film and was determined from film samples taken from each film. Four film samples were cut 1" (2.54 cm) wide by 7" (17.8 cm) long in the machine direction and 1" (2.54 cm) wide by 7" (17.8 cm) long in the traverse direction. The average thickness of the film samples was determined and recorded and a strip chart recorder was calibrated at 0 gram and at 1,000 grams full scale load. Each film sample was then secured between the two clamps spaced 10 cm apart. One clamp is in a fixed position and the other is connected to a strain gauge transducer. The secured film sample and clamps were then immersed in a silicone oil bath maintained at a constant, elevated temperature for a period of five seconds. During this time, the force in grams at the elevated temperature was read from the strip chart and this reading was recorded. At the end of this time, the film sample was removed from the bath and allowed to cool to room temperature whereupon the force in grams at room temperature was also read from the strip chart and recorded. The shrink force for the film sample was then determined from the following equation wherein the results is obtained in grams per mil of film thickness (g/mil):

$$\text{Shrink Force } (g/mil) = F/T$$

wherein F is the force in grams and T is the average thickness of the film samples in mils.

Impulse Seal Range:

The impulse sealing range test determines the acceptable voltage ranges for impulse sealing plastic films. A Sentinel Model 12-12AS laboratory sealer manufactured by Packaging Industries Group, Inc., Hyannis Mass., U.S.A. was used. This impulse sealer is equipped with a replacement sealing ribbon for a Multivac AG100 brand packaging machine. The ribbon is available from Koch Supplies of Kansas City, Mo. In this test, two four inch wide (T.D. direction) samples are cut from a tubular film. The impulse sealer is equipped with controls for coolant flow, impulse voltage and time, and seal bar pressure. These controls except for impulse voltage are set at the following conditions:

| | |
|---|---|
| 0.5 | seconds impulse time (upper ribbon only) |
| 2.2 | seconds cooling time |
| 50 | psi (345 kPa) jaw pressure |
| 0.3 | gallon per minute (1 liter per minute) of cooling (about 75° F. (22° C.)) water flow |

One of the samples is folded in half for use in determining a minimum sealing voltage. This folding simulates folding which may inadvertently occur during conventional bag sealing operations. The folded sample which now has four sheets or portions of film (hereinafter referred to as "sheet portions") is placed into the sealer and by trial and error the minimum voltage to seal the bottom two sheet portions to each other was determined.

The maximum voltage is then determined for a sample having two sheet portions by placing it in the sealer and then activating the seal bar. The film sample is manually pulled with about 0.5 lbs. of force and the voltage which does not cause burn through or significant distortion of the seal is determined.

Gassing Test: The Gassing Test is an evaluation of film adherence to a vacuum packaged respiring natural cheese. In this test a rectangular block of respiring natural cheese is vacuum packaged in a film which is hermetically sealed. Due to microbiological activity many natural cheeses such as emmental (swiss) respire or give off $CO_2$. Therefore, over time $CO_2$ gas will build up in a sealed film package unless the film is permeable to $CO_2$. This build up of gas will inflate the sealed package if the rate of $CO_2$ generation is greater than the rate of permeability $CO_2$ through the film wall. The amount of inflation will depend upon both the gas production rate and the film permeability or gas transmission rate. Film adherence to the surface of the packaged cheese is visually evaluated and given a numerical value from 0 to 10, with greater value numbers indicating less adherence and more ballooning. 0=complete film adherence to the cheese product. 5=film ballooned on flat sides, but product corners and edges in contact with film, 7=film ballooned away from all surfaces except corners, 10=complete film ballooning away from all product surfaces including flat sides, edges and corners. The same person evaluates all packages in a test to ensure accuracy. Evaluations are made over time and the time elapsed for each evaluation is reported, generally in days. The packaged cheeses are all held at about 35° F. (~2° C.) over the evaluation period. Standard deviation for multiple examples may be reported as may differences (Δ) in values for particular packages from one test evaluation over time to the next evaluation.

Following are examples and comparative examples given to illustrate the invention.

In all the following examples, unless otherwise indicated, the film compositions were produced generally utilizing the apparatus and method described in U.S. Pat. No. 3,456,044 (Pahlke) which describes a coextrusion type of double bubble method and in further accordance with the detailed description above. All percentages are by weight unless indicated otherwise.

EXAMPLES 1–6

In Examples 1–3, three biaxially stretched, heat shrinkable, multilayer films of the present invention were made. The layers of each multilayer film were coextruded and biaxially stretched according to a coextrusion type of tubular orientation process.

Examples 1–3 are five layered films. However, films of six or more layers are also contemplated by the present invention. The inventive multilayer films may include additional layers or polymers to add or modify various properties of the desired film such as heat sealability, interlayer adhesion, food surface adhesion, shrinkability, shrink force, wrinkle resistance, puncture resistance, printability, toughness, gas or water barrier properties, abrasion resistance and optical properties such as gloss, haze, freedom from lines, streaks or gels. These layers may be formed by any suitable method including coextrusion, extrusion coating and lamination.

For Examples 1–3, one extruder was used for each layer and the heat plastified resins from each extruder were introduced to a 5 layer spiral plate coextrusion die from which the resins were coextruded at an inner/first adhesive/core/second adhesive/outer layer thickness ratio of about 63:3:3:3:28 for Examples 1–3.

In Examples 1–3, for each layer, the resin or resin mixture was fed from a hopper into an attached standard single screw extruder where the resin and/or mixture was heat plastified and extruded through a five layer coextrusion spiral plate die into a primary tube. The extruder barrel temperatures for the core layer was about 400° F. (204° C.) and for the first and second adhesive layers were about 370° F. (188° C.) and for the inner and outer layers were about 300° F. (149° C.). The extrusion die had an annular exit opening of 3 inch diameter with a 0.060 inch gap (7.62 cm×0.152 cm). The coextrusion die temperature profile was set from about 400° F. to 420° F. (204° C.–216° C.). The extruded multilayer primary tube was cooled by spraying with unheated tap water (about 12–24° C.).

The cooled primary tube was flattened by passage through a pair of nip rollers whose speed was controlled to neck down the primary tube to adjust the tube circumference or flat width. In Examples 1–3, a flattened tube of about 3 inches (7.62 cm) flat width and about 21 mil (0.0533 cm) thickness was produced. The cooled flattened primary tube was reheated, biaxially stretched, and cooled.

The cooled film was flattened and the biaxially stretched and biaxially oriented film was wound on a reel. The machine direction (M.D.) draw or orientation ratio was about 3.75 and the transverse direction (T.D.) bubble or orientation ratio was about 3.0 for all the films. The draw point or orientation temperature was below the predominant melting point for each layer oriented and above that layer's glass transition point. Draw point temperature, bubble heating and cooling rates and orientation ratios are generally adjusted to maximize bubble stability and throughput for the desired amount of stretching or orientation. The resultant films of Examples 1–3 were biaxially oriented and had an excellent appearance. These films were all irradiated at a level of 3.3 Mrad by electron beam after orientation and according to methods well known in the art to cause crosslinking, especially of the inner and outer polymeric layers.

For all of the Examples 1–3, the inner layer (which was the interior surface of the tubular film) comprised 100% by weight of an ethylene vinyl acetate copolymer having a vinyl acetate content of 10.5%, a density of 0.934 g/cm$^2$, a melt index of 0.3 g/10 min., and which is commercially available under the trademark LD701 from Exxon Chemical Company of Houston, Tex., U.S.A.

The outer layer of Examples 1–3 (which was the exterior surface of the tube) also contained the same EVA as the inner layer but as a component of a blend. In Examples 1 and 2, 76% of the EVA copolymer was blended with 20% of a very low density polyethylene sold by Dow Chemical Company of Midland, Mich., U.S.A. under the trademark Attane XU 61520.01 which is a copolymer of ethylene and octene-1 having a melt index of about 0.5 dg/min and a density of about 0.912 g/cm$^3$, with a Vicat softening point of 95° C. and a melting point of about 123° C. Also in the outer layer blend of EVA and VLDPE is 4% by weight of a fluoroelastomer processing aid sold under the trademark Ampacet 100031 by Ampacet Corp. of Tarrytown, N.Y., U.S.A. The outer layer for Example 3 was similar to that of Examples 1 and 2, but contained 44.3% of the above noted VLDPE; 36.3% of the EVA copolymer, 4.4% of the processing aid and as an added constituent contained 15% of an ethylene alpha-olefin plastomer-type copolymer believed to be an ethylene butene-1 copolymer having a reported melting point of 71° C. and sold under the trademark Tafmner A-1085 by Mitsui Petrochemical Industries, Ltd. of Tokyo, Japan.

For Examples 1 and 2, the first adhesive layers were identical blends of 30% of the same EVA copolymer used in the inner layer with 40% of a very low density polyethylene which is a copolymer of ethylene and octene-1 copolymer having a density of about 0.912 g/cm3, a melt index of about 0.5 dg/min., and which is sold under the trademark Attane XU61509.32 by Dow Chemical Company of Midland, Mich., U.S.A. The first adhesive layer, in addition to the above 30% EVA and 40% VLDPE, contained 30% of an extrudable anhydride modified linear low density polyethylene based tie layer resin having the following reported properties: density of 0.925 g/cm$^3$, melt index of 2.0 dg/min., a melting point of about 125° C., a vicat softening point of about 102° C., and is available under the trademark Plexar® PX360 from Quantum Chemical Corporation, Cincinnati, Ohio, U.S.A. The second adhesive layer of each of Examples 1 and 2 was identical to the corresponding first adhesive layer. For Example 3, the first and second adhesive layers were also a blend of the same three components used in Examples 1 and 2, but in different amounts, For Example 3, the first and second adhesive layers contained identical blends of 52.5% VLDPE, 17.5% EVA and 30% of the anhydride modified LLDPE resins.

For Example 1, the core layer comprised a 80:20 percent by weight blend of a saponified ethylene-vinyl acetate copolymer (EVOH) with a nylon. A premix was formed by blending 80% EVOH with 20% nylon. This premixed blend was then added to an extruder hopper for extrusion as the core layer. The EVOH was a commercially available copolymer sold by Eval Company of America of Lisle, Ill., U.S.A. under the trademark EVAL G110A and had a reported ethylene content of 48 percent by weight, and a melt index of 14 dg/min and a melting point of 158° C. The nylon was a commercially available nylon 6/66 copolymer sold by Allied Chemical Company under the trademark Capron Xtraform XPN1539 and had a reported nylon 6 content of 85 mole % and nylon 66 content of 15 mole % with a DSC melting point of about 195° C., and a density of 1.13 g/cm$^3$.

For Examples 2 and 3, the core layer constituents were the same as those used in Example 1, but the relative amounts were different. In Example 2, 60% EVOH was blended with 40% nylon 6/66 copolymer. In Example 3, 30% EVOH was blended with 70% nylon 6/66 copolymer.

Comparative Examples 3–6 are not of the invention, but are prior art examples of commercial films used for packaging cheese. The comparative film of Example 4 is believed to be a four layer film of the structure EVA/EVA/PVDC/EVA, whereas comparative Examples 5 and 6 are believed to be three layer films with Example 5 having a structure of EVA/nylon:EVOH blend/ionomer and Example 6 having a structure of ionomer/polyethylene/nylon. All of these comparative examples are heat shrinkable.

Layer formulations of Example 1–6 are reported in Table 1. Physical properties of the films of Examples 1–6 were measured and are reported in Tables 2 and 3.

TABLE 1

| Ex. No. | Inner Layer | 1st Adhesive Layer | Core Layer Composition* | 2nd Adhesive Layer | Outer Layer |
|---|---|---|---|---|---|
| 1 | 100% EVA | 40% VLDPE<br>30% EVA<br>30% Anhydride Modified LLDPE | 80% EVOH<br>20% Nylon<br>(3%)<br>(0.07 mil)† | Same as 1st Ad Layer | 20% VLDPE<br>76% EVA<br>4% Processing Aid |
| 2 | 100% EVA | 40% VLDPE<br>30% EVA<br>30% Anhydride Modified LLDPE | 60% EVOH<br>40% Nylon<br>(3%)<br>(0.08 mil)† | Same as 1st Ad Layer | 20% VLDPE<br>76% EVA<br>4% Processing Aid |
| 3 | 100% EVA | 52.5% VLDPE<br>17.5% EVA<br>30% Anhydride Modified LLDPE | 30% EVOH<br>70% Nylon<br>(3%)<br>(0.07 mil)† | Same as 1st Ad Layer | 44.3% VLDPE<br>36.3% EVA<br>15% Plastomer<br>4.4% Processing Aid |
| 4 | EVA | EVA | PVDC<br>(5%)<br>(0.1 mil) | — | EVA |
| 5 | EAA | — | Nylon:EVOH<br>(21–24%)<br>(0.6–0.7 mil) | — | Ionomer |
| 6 | Ionomer | — | Polyethylene | — | Nylon**<br>(54–59%)<br>(1.3–1.6 mil) |

*The core layer thickness is given first as a percentage of the total multilayer film and secondly the measured thickness for the layer.
**For Example 6, the outer layer is reported since this layer is believed to control the $CO_2$ and $O_2$ permeabilities.
†Calculated value.

The results in Table 2 demonstrate that films according to the present invention have good physical properties. The tensile strength properties of Examples 1–3 of the invention are comparable to the commercially available films for packaging cheese of comparative Example 4. Although comparative Example 6 is stronger than the films of the Examples 1–3, all of the inventive films have adequate and excellent strength for many utilities including packaging of foodstuffs including cheeses. The elongation at break values of the Examples 1–3 are similar to those reported for a film similar to comparative Example 4, and are lower than the values reported for comparative Examples 5 and 6. For packaging articles such as cheeses, the reported elongation at break values for the example films of the invention have very good extensibility which is adequate to accommodate any stretching encountered under typical packaging and process conditions.

The shrinkage values for Examples 1–3 are very good especially for a film containing EVOH. The transverse direction values are all near 50% at 90° C. and shrinkage at lower temperatures of 85° C. and 80° C. are all superior to the 90° C. shrinkage values for comparative Example 5. Although shrinkage values for comparative Example 5 were not measured at the lower temperature, it would be expected in the art that such values would be less than the values obtained at a higher temperature. Therefore the inventive films may have desirably high shrinkage values which may be greater than 20% in either or both directions at 90° C. and beneficially may be greater than 30%. Examples 1–3 had values measured in excess of 35% in the machine direction (MD) as well as the transverse direction. High shrinkage especially at 90° C. or lower is an advantage in packaging articles such as hard or semi-hard cheese to provide close contact between the film and the enclosed article surface which prevents or lessens damage which may be caused by contact with oxygen or by movement of the article within the package. A further advantage of the invention relative to the prior art EVOH containing film of Example 5 is that good shrinkage values may be obtained at a lower temperature thereby using a shrinking process which has lower energy requirements. Perhaps more importantly where the packaged article is a foodstuff, low temperature shrinking reduces exposure of the foodstuff to higher temperatures which may produce sensory defects and/or promote undesirable growth of pathogenic or spoilage microbes including bacteria or molds.

Unrestrained shrinkage values were also obtained at a very high temperature of 220° F. (104° C.) for the examples of the invention. Example 1 has a shrinkage value at 220° F. (104° C.) of 54% in the machine direction (MD) and 53% in the transverse direction (TD). For Example 2 these respective values at 104° C. were 57% MD/52% TD and for Example 3 shrinkage values were 53% MD/53% TD at 104° C. These values were obtained for comparison to those values obtained and reported in Examples 5–8 of European Patent Application 457,598 where the films having EVOH:nylon blend core layers all had reported shrinkage values at 104° C. which were substantially less than those values obtained with the present invention. The highest value was reported in Example 7 of the European Application and had reported MD/TD shrinkage values of 24%/30%.

Also the shrink forces reported for Examples 1–3, especially the residual shrink forces, are at levels desirable to hold the film in close contact with the enclosed article not only during possible processing subsequent to packaging e.g. pasteurization, but also at room temperature. The residual shrink force at room temperature is important e.g. when a package may be opened exposing one end to the deleterious effects of exposure to the environment. Films and bags having a high residual shrink force such as those values reported for Example 1–3 of the invention have continued close contact between film and article even after opening. The measured values of Examples 1–3 indicate that the film would be kept in close contact with an enclosed article and continue to maintain its protective functions. For example, when the enclosed article is a cheese, close contact with film after loss of a vacuum within the package will lessen moisture loss (and therefore weight loss) and minimize growth of aerobic organisms including molds. Growth of undesirable molds leads to waste because these moldy portions are often cut away and discarded, while moisture loss leads to dried out portions which have an undesirable texture which may become so hard that again portions of the cheese are cut away and discarded. Of course exposure of the surface of a cheese to the atmosphere (as often happens when a nonshrink film or a film having no or low residual shrink is employed) may facilitate the cheese acquiring an off taste or odor which is disagreeable.

TABLE 2

| Ex. No. | Avg GAUGE mil (micron) | FLAT WIDTH (mm) | ELONGATION AT BREAK % at RT MD/TD | TENSILE STRENGTH × $10^3$ psi at RT (mPa) MD/TD | SHRINK at 90° C. % MD/TD | SHRINK at 85° C. % MD/TD | SHRINK at 80° C. % MD/TD | SHRINK FORCE at 90° C. gm/mil (Kg/cm) MD/TD | at RT gm/mil (Kg/cm) MD/TD |
|---|---|---|---|---|---|---|---|---|---|
| 1 | 2.27 (57.7) | 260 | 168/129 | 9.1/6.7 (63/46) | 38/49 | 27/41 | 22/33 | 163/147 (64/58) | 78/85 (31/33) |
| 2 | 2.53 (64.3) | 337 | 137/166 | 9.3/6.7 (64/46) | 37/48 | 26/41 | 19/33 | 148/122 (58/48) | 61/92 (24/36) |
| 3 | 2.28 (57.9) | 267 | 157/125 | 8.3/7.7 (58/53) | 36/48 | 28/40 | 21/32 | 128/157 (50/62) | 59/88 (23/35) |
| 4 | 2.15 (54.6) | 270 | 206/108† | 8.7/7.1† | 51/56 | ND | ND | ** | ** |
| 5 | 2.90 (73.7) | 219 | 398/580 | 6.0/6.4 | 16/12 | ND | ND | ND | ND |
| 6 | 2.41 (61.2) | 92 | 607/804 | 10.7/9.9 | 33/17 | ND | ND | *** | *** |

ND = NOT DETERMINED
RT = ROOM TEMPERATURE (~20–23° C.)
† The elongation at break and tensile strength values listed are for a similarly identified film. These properties were not measured for this film sample which is believed to have similar values.
*Examples 1–3 were also tested at 220° F. (104° C.) and had unrestrained shrinkage percentage values of 54/53 MD/TD for Example 1; 57/52 MD/TD for Example 2; and 53/53 MD/TD for Example 3.
**The shrink force was not measured for this film sample, but a similarly identified film had MD/TD shrink force values at 90° C. of 125/145 gm/mil (49/57 Kg/cm) and at RT of 45/45 g/mil (18/18 Kg/cm).
***The shrink force was not measured for this film sample, but similarly identified films had MD/TD shrink force values at 90° C. which ranged from 40–56/9–21 gm/mil (16–22/3.5–8.3 Kg/cm) and at RT of 0/38–68 gm/mil (0/15–27 Kg/cm).

TABLE 3

| EX. No. | $CO_2$GTR† at 5° C. 0% RH | $CO_2$GTR† at 20° C. 0% RH | $O_2$GTR† at RT 0% RH | WVTR†† | HAZE % | GLOSS AT 45° ANGLE | IMPULSE SEAL RANGE (VOLTS) |
|---|---|---|---|---|---|---|---|
| 1 | 106–119* | 268–288* | 54 (61)** | 25 (53) | 6.7 | 76 | 29–49 |
| 2 | 194–322* | 462–752* | 81 (61)** | 22 (58) | 6.7 | 75 | 28–48 |
| 3 | 481–564* | 1110–1260* | 167 (56)** | 22 (53) | 5.1 | 79 | 29–46 |
| 4 | ND | ND | 357 (48) | 25*** (53) | 7.4 | 74 | 32–50+ |
| 5 | ND | ND | 147 (69) | 9 (69) | ND | 24 | 29–36 |
| 6 | ND | ND | 310 (52) | 26 (56) | 26.8 | 43 | 26–29 |

ND = NOT DETERMINED
RT = ROOM TEMPERATURE (~20–23° C.)
RH = RELATIVE HUMIDITY
† Carbon dioxide gas transmission rate ($CO_2$GTR) and Oxygen gas transmission rate ($O_2$GTR) in units of $cm^3$ per $meter^2$ per 24 hours at 1 atmosphere for the film tested. For $O_2$GTR the film thickness is below the rate in microns ( ).
†† Water vapor transmission rate (WVTR) in units of g per $meter^2$ per 24 hours at 100° F. (37.8° C.) under ambient pressure (~1 atmosphere) for the thickness of film tested which is listed below the rate in microns ( ).
*Two measurements were made at 0% relative humidity and both are presented.
**Measured film thickness of test area in microns.
***WVTR was not measured for this film, but a similarly identified film had a WVTR of 25 g per $m^2$ for a film 53 microns thick.

Referring now to the film formulations listed in Table 1 and the properties and test results reported in Table 3, it is seen that decreasing the amount of EVOH and increasing the amount of nylon in the core layer blend produces films have a greater permeability to gases such as carbon dioxide and oxygen. The permeability of $CO_2$ was measured at both 5° C. and 20° C. with the lower temperature representing a typical refrigeration temperature for foodstuffs such as cheese. Advantageously, the oxygen permeabilities for the inventive films of Examples 1–3 are much lower than the $O_2$GTR for the comparative film of Example 4 which has a chlorine containing polyvinylidene chloride barrier layer and also much lower than the $O_2$GTR for the comparative film of Example 6 which is believed to rely upon an outer nylon layer for its barrier properties. EVA, polyethylene and ionomer resins are generally not classed as gas barrier polymers and are known to be very permeable to both oxygen and carbon dioxide. In all of the examples the layers containing PVDC, EVOH and/or nylon are believed to be the gas permeability rate controlling layer. Interestingly, comparative Example 5 has an oxygen permeability ($O_2$GTR) similar to that measured for the inventive film of Example 3.

The films of the invention in Examples 1–3 all had a carbon dioxide transmission rate ($CO_2$GTR) at 1 atmosphere at 24 hours, and 0% relative humidity which was at least 100 $cm^3/m^2$ at 5° C. and at 20° C. the $CO_2$GTR was at least 250 $cm^3/m^2$. In Examples 1–3 the $CO_2$GTR for the highest $CO_2$ permeability film of the invention (Example 3) was at least 400 $cm^3/m^2$ at 5° C. and at least 900 $cm^3/m^2$ at 20° C. (both at 24 hours, 1 atmosphere and 0% relative humidity). The $CO_2$ permeability film of Example 2 had a $CO_2$GTR of at least about 200 $cm^3/m^2$ at 5° C. and at least 450 $cm^3/m^2$ at 20° C. (both at 24 hours, 1 atmosphere and 0% relative humidity). The room temperature (about 20–23° C.) $O_2$GTR of the inventive Examples 1–3 were above 50 $cm^3/m^2$ for all the Examples (1–3) with Example 2 being above 75 $cm^3/m^2$ and the high $CO_2$ permeability film of Example 3 having a value above 100 $cm^3/m^2$ (all at 1 atmosphere, 0% relative humidity for 24 hours). Also, the $O_2$GTR values for these three examples of the invention (1–3) were all less than 200 $cm^3/m^2$ at room temperature (about 20–23° C.), 1 atmosphere, 0% relative humidity and at 24 hours.

The nylon:EVOH blend core layer of the film of comparative Example 5 was determined to be about 0.6–0.7 mil (15–18 microns) thick compared to about 0.07 mil±0.01 (1.8 microns±0.2) for Examples 1–3. Therefore the invention obtains an equivalent oxygen barrier with a barrier layer which is 1/10 as thick as that found in comparative Example 5. The nylon component of the Example 5 film had a melting point of (~193° C.) and the EVOH component had a melting point (~172° C.). Spectrographic analysis indicated that nylon was a major component of the blend while EVOH was indicated to be a minor component.

Furthermore, all of the Examples 1–3 of the invention exhibited much higher shrinkage values than those of Example 5. The film of Example 5 contained a relatively thick core layer of nylon and EVOH which constituted about 21–24% of the thickness of the multilayer film. Advantageously the present invention as embodied in Example 3 utilized an economically thin core layer which provided a similar oxygen permeability to comparative Example 5, but much superior shrinkage values at 90° C., superior optics and a broader sealing range. The inventive films of Examples 1 and 2 also provide gloss values which are significantly better and sealing ranges which are significantly wider than corresponding properties of the comparative film of Example 5. The wide sealing range permits the inventive film to be heat sealed at higher temperatures without burn through than the prior art film. The examples of the invention also have better optical properties which give a better appearance as indicated by the gloss values. The inventive films have a better appearance including high gloss, and low haze with very good clarity for an EVOH containing film. The haze of comparative Example 5 was not determined because the sample contained a colorant which would have produced a high haze value regardless of the inherent haziness of the film relative to the clear film samples of the invention which did not contain any added colorants. The water vapor transmission rates of Examples 1–3 had similar values to the comparative Examples 4 and 6, but were higher than the measured value for comparative 5. All of the water vapor transmission rates were acceptable for packaging cheese and no noticeable weight loss differences between the examples were seen in tests 7–18 as discussed below.

The ionomer/polyethylene/nylon film of comparative Example 6 had a higher oxygen permeability than the films of Examples 1–3, a poorer appearance as demonstrated by the high haze and low gloss values and an undesirably narrow heat sealing range. Example 6 also used the relative expensive ionomer resin as a main component of its inner sealing layer.

Comparative Example 4, which is a commercially available and acceptable film used for packaging cheeses also had a higher oxygen permeability than the films of the invention. This comparative film had an EVA/EVA/PVDC/EVA structure which had a chlorine-containing polymer. The inventive films are free from chlorine-containing polymers and therefore are more readily incinerated or recycled.

EXAMPLES 7–12

In these examples weight loss, mold growth and gassing of emmental type (swiss) cheese sealed in bags made from the films of Examples 1–3 of the invention were tested along with a control barrier film and two commercially available cheese packaging films. Swiss cheese was chosen for this test because this type of cheese is known to produce large quantities of carbon dioxide gas both during aging at the cheese factory and after packaging for shipment and sale. The lower grade of swiss cheese is generally believed to give off more gas than higher grades of Swiss cheese, however, both (respire) great amounts of carbon dioxide in the post-aging stage where the cheese has been packaged for delivery to customers of the cheese manufacturer e.g. groceries, restaurants and institutions such as hospitals and schools.

In view of this high $CO_2$ respiration rate, packaging of swiss cheese represents a difficult test for $CO_2$ permeable packaging. If a packaging film has a suitably sufficient $CO_2$ permeability to minimize or eliminate package pillowing or ballooning for swiss cheese, then it is believed that most other types of respiring cheeses could be packaged in the same film without ballooning. Ballooning is considered a packaging defect in that consumers perceive respiring products in ballooned packages such as ballooned packages of cheese to be inferior and defective. Therefore consumers are believed to be less likely to purchase such products notwithstanding the wholesomeness of the packaged product. Since ballooning is recognized to be a result of biological activity it is often adversely viewed by the consumer even where such biological activity, is a normal characteristic of the product. Also, where ballooning is severe there is concern that the integrity of package seals or clips could become impaired. Furthermore, ballooning separates the film from the surfaces of the packaged foodstuff which facilitates mold growth in the presence of oxygen. Swiss cheese may be made by variations of cheese making processes and the method employed to make swiss or any particular cheese should not be considered as limiting the present invention which provides an inventive film and use as a cheese package. Common starter cultures may include *Lactobacillus bulgaricus, Streptococcus thermophilous* and *Propionibacter shermanii*. A suitable method for making a swiss-type cheese is that disclosed in U.S. Pat. No. 2,494,636 which patent is hereby incorporated by reference in its entirety. Example 7 was a control film (not of the invention) which was an oxygen barrier, heat shrinkable, heat sealable, multilayer film having an EVA inner layer, a plasticized vinylidene chloride copolymer core layer and an outer layer of a blend of about 20% VLDPE, 76% EVA and 4% processing aid. Example 8 was a comparative example (not of the invention) of a commercially available cheese packaging film having an EVA inner layer, an outer layer similar to that above in Example 7, and a vinylidene chloride copolymer core layer as in Example 7, but having about double the amount of plasticizer to increase gas permeability.

Example 9 was a comparative example (not of the invention) of a commercially available cheese packaging film known to be in commercial use to package Swiss cheese for retail sale. Example 9 is believed to be similar in layer composition and construction to Example 4 of Table 3 and also is believed to have similar properties to those disclosed above for Example 4. Examples 10–12 were examples of the invention and are bags made from films corresponding to those described above in Examples 1–3 respectively. The bags of Examples 7–12 were divided into two identical sets for packaging two different grades of cheese. The second set is renumbered 13–18 with the film used for Example 13 corresponding to that film used for 7, and the film 14 corresponding to film 8 and so on ending with film 18 being the same as film 12.

For Examples 7–18, various films were packaged with aged hard cheese (Swiss) made and packaged generally according to the following description.

Cheese curd suitable for making Swiss-type cheese was made using a *Lactobacillus bulgaricus* starter culture in milk and was formed into 100 lb. blocks and held for 24 hours in vats. Then to reduce the pH of the cheese a brine solution was added and maintained at about 45° F. (7° C.) for another 24 hours (an antimycotic agent was also added in the brine). The pH adjusted blocks of cheese were then placed in barrier bags, evacuated and heat sealed. These barrier bags are believed to have been nonshrinkable bags having a vinylidene chloride copolymer oxygen barrier layer with low gas permeabilities eg. having a very low oxygen permeability (less than 15 cm$^3$ per m$^2$). The packaged blocks were held at about 41° F. (5° C.) for 12 days and then further aged for 20–24 days at about 72–74° F. (22–23° C.). The cheeses were then graded according to the Wisconsin grading system and further aged between 12–28 days at about 34–36° F. (1–2° C.)

After the above low temperature aging, the 100 lb. blocks were recut into blocks weighing between 2–18 lb., graded again and packaged in the test bags of Examples 7–18. Examples 7–12 were all packages of Grade A Swiss cheese, in which the cheese was graded according to standards set by the State of Wisconsin, U.S.A. Examples 13–18 were an identical set of bags corresponding to those used in Examples 7–12 and these bags were used to package Grade C Swiss cheese.

Typically, seven or ten lb. blocks are cut from each 100 lb block for retail packaging, however for the present examples the cheese was cut to fit the various sized test bags of Examples 7–18. Cheeses were packaged by placing each cheese (which had been held at a temperature of about 36° F. (2° C.) prior to packaging) into a test bag which was then evacuated, clipped closed and briefly passed through a shrink tunnel set at a temperature of 202° F. (94° C.) for a few seconds to shrink the film around the enclosed cheese. The packaged cheeses were weighed and then held at a temperature of about 36° F. (2° C.). Then the packaged cheeses were transported from the cheese plant to a test facility where they were evaluated one day after packaging for gassing and microbial growth. After this initial evaluation the packaged cheeses were stored at about 34° F. (1° C.) and reevaluated 27 days later and 63 days later. The results of these evaluations are listed in Tables 4 and 5.

TABLE 4

GRADE A CHEESE

| EX. NO. | FW (mm) | AVG. WEIGHT LOSS (%) at DAY 27 | AVG. WEIGHT LOSS (%) at DAY 63 | GASSING TEST* #1 1 DAY | 27 DAY | Δ | 63 DAY | Δ | #2 1 DAY | 27 DAY | Δ | 63 DAY | Δ |
|---|---|---|---|---|---|---|---|---|---|---|---|---|---|
| 7 | 238 | <0.1 | <0.1 | 3.0 | 6 | 3 | 6 | 0 | 3.0 | 5 | 2 | 6 | 1 |
| 8 | 248 | <0.1 | <0.1 | 3.0 | 6 | 3 | 7 | 1 | 3.0 | 7 | 4 | 8 | 1 |
| 9 | 249 | 0.1 | 0.1 | 3.5 | 7 | 3.5 | 5 | −2 | 3.5 | 7 | 3.5 | 5 | −2 |
| 10 | 264 | 0.1 | 0.1 | 3.0 | 5 | 2 | 5 | 0 | 3.0 | 6 | 3 | 4 | −2 |
| 11 | 335 | 0.1 | 0.1 | 3.0 | 5 | 2 | 4 | −1 | 3.0 | 6 | 3 | 6 | 0 |
| 12 | 267 | 0.2 | 0.2 | 2.0 | 3 | 1 | 3 | 0 | 2.0 | 2 | 0 | 3 | 0 |

*Two sets of cheese packages were evaluated and results for both sets are presented separately as #1 and #2.
FW = Flatwidth

TABLE 5

GRADE C*

| EX. NO. | FW (mm) | AVG. WEIGHT LOSS (%) AT DAY 27 | AVG. WEIGHT LOSS (%) AT DAY 63 | GASSING TEST | | | | | $CO_2$ GTR (5° C.) $cm^3/m^2$** | $O_2$ GTR at RT $cm^3/m^2$** | WVTR† $(g/m^2)$ |
|---|---|---|---|---|---|---|---|---|---|---|---|
| | | | | 1 DAY | | 27 DAY | | 63 DAY | | | |
| | | | | AVG | σ | AVG | σ | AVG | | | |
| 13 | 238 | 0.1 | 0.1 | 2.9 | 0.8 | 5.8 | 1.0 | 6.0 | 4 | 17 | 8 |
| 14 | 247 | <0.1 | 0.3 | 3.3 | 1.3 | 5.8 | 2.1 | 6.4 | 109 | 116 | 19 |
| 15 | 249 | 0.1 | 0.1 | 3.5 | 0.8 | 6.0 | 0.8 | 7.4 | 90–93 | 217 | 20 |
| 16 | 264 | 0.1 | 0.1 | 3.4 | 1.2 | 5.3 | 2.5 | 6.1 | 106–119 | 54 (61) | 25 |
| 17 | 335 | 0.1 | 0.1 | 4.4 | 0.8 | 6.5 | 1.6 | 6.6 | 194–322 | 81 (61) | 22 |
| 18 | 267 | 0.1 | 0.1†† | 3.0 | 0.3 | 2.8 | 1.1 | 2.0*** | 481–564 | 167 (56) | 22 |

σ = Standard deviation
FW = Flatwidth
*Average of 8 cheese packages.
**Per 24 hours at 1 atmosphere and 0% relative humidity. For $CO_2$GTR Examples 16–18 two values were measured and both are reported. For Examples 13–15 values are measured values for similarly identified films.
***Average of 4 cheese packages. A box containing 4 additional packages was lost during the test. The 26 day average for this set of 4 packages was 1.9.
† Water Vapor Transmission Rate (WVTR) in units of grams per meter$^2$ per 24 hours at 100° F. (37.8° C.) under ambient pressure (~1 atmosphere) for the thickness of film total.
†† Average of 4.

Referring now to Tables 4 and 5, the Gassing Test results demonstrate that all of the cheese packages according to the present invention show excellent $CO_2$ permeability relative to the control barrier film of Examples 7 and 13, as well as the comparative commercial cheese films of Examples 8, 9, 14 and 15 which utilized a plasticized PVDC core layer. The most permeable film was that of Examples 12 and 18 whose average rating remained at 3 or below over the 63 day evaluation demonstrating that the films was very permeable $CO_2$ by remaining well adhered to corners, edges and large portions of the flat surfaces. These high gas permeabilities, which are shown with regard to Grade A and Grace C swiss cheese, indicate the suitability and superior performance of the inventive film of Examples 12 and 18 for packaging cheeses having a high gassing rate including respiring hard cheeses and cheeses such as those listed in Table A under the High $CO_2$ Permeability heading. The cheese packages according to the invention of Examples 10, 11, 16 and 17 indicate permeabilities as good as those found in presently commercialized films using PVDC gas permeability controlling layers and these inventive films are well suited for packaging semi-hard respiring cheeses and cheeses of low to medium $CO_2$ permeability such as those listed under those headings in Table A.

For all of the Examples 7–18 there was no commercially significant weight loss at either 27 days following packaging or at the evaluation made 63 days after packaging. The cheeses were also examined by eye for mold growth and none was seen on any of the samples of the examples 7–18 at either the 27 day evaluation or the 63 day evaluation. This demonstrates that the inventive films perform as well as commercially used films containing PVDC with respect to weight loss and mold growth over the test period.

It is believed that the inventive film may be advantageously employed to package other gas releasing foodstuffs besides cheeses, for example, fruits or vegetables. In this regard the combination of high moisture barrier properties with gas permeability would appear to be desirable attributes for packaging of fruits and vegetables. Another utility is the packaging of fresh cut flowers or as a horticultural film. Also, there may be industrial applications as an environmentally compatible film.

EXAMPLES 19–21

Five layer tubular films designated here as Examples 19–21 were made by a biaxial stretching orientation process. This process was similar to that disclosed above for making the films of Examples 1–3, but these films were not irradiated.

These examples demonstrate the effect of changing the mole percent ethylene content of the EVOH component of the core layer blend. In all of the examples below, a core layer blend of 80 wt. % EVOH and 20 wt. % nylon 6/66 copolymer was used. In Example 19 of the invention an EVOH having an ethylene content of 48 mole % was used whereas in Examples 20 and 21 EVOH copolymers having ethylene contents of 44 and 38 mole %, respectively, were employed.

The film of Example 19 had an inner heat sealable layer which comprised 100% by weight of an ethylene vinyl acetate copolymer which was sold by Union Carbide Corporation (UCC) of Danbury, Conn. U.S.A. under the trademark DQDA 6833. This EVA copolymer reportedly had a vinyl acetate content of about 10% by weight, a melting point of about 98° C. (as measured by a differential scanning calorimetry (DSC), and a reported melt index of 0.25 g/10 minutes. This same EVA resin was also employed as 76.5% of a blend formulation which made up the outer layer.

In addition to EVA, the outer layer blend contained 19.1% of a very low density polyethylene (VLDPE) which is available from UCC under the trademark DEFD 1192, and 4.4% of a processing aid. The VLDPE was an ethylene-butene-1-hexene-1 terpolymer having a reported density of 0.912 g/cm$^3$, a melt index of 0.19 g/10 min., and a melting point (by DSC) of about 122° C.

The inner and outer layers are connected to opposing sides of a core layer (which comprises a blend of EVOH and nylon) by intermediate adhesive layers of identical composition. Both adhesive layers comprised a blend of 53% of the above noted VLDPE with 17% of the above noted EVA and 30% of an adhesive or tie layer resin which was commercially available from Quantum Chemical Corporation of Cincinnati, Ohio U.S.A. under the trademark Plexar 3741. This Plexar 3741 adhesive material is believed to be an anhydride modified ethylene copolymer adhesive having an ethylene-butene-1 linear low density polyethylene base resin. The adhesive resin has a reported melt index of 1.5 dg/min. at 190° C. according to ASTM D-1238 and a melting point of about 120° C.

The core layer controlled the permeability of the film with regard to gases such as oxygen and carbon dioxide. The core layer contained 80% by weight of an ethylene vinyl alcohol copolymer (EVOH) which was commercially available from EVAL Company of America (EVALCA) of Lisle, Ill., U.S.A. under the trademark EVAL G156. This EVAL G156 EVOH resin reportedly has an ethylene content of 48 mole %, and a melt index of 6.4 dg/min., and a melting point of about 158° C. Blended with the EVOH of the core layer was 20% by weight of a nylon 6/66 copolymer sold by Allied-Signal, Inc. of Morristown, N.J., U.S.A. under the trademark Capron Xtraform 1539 (hereinafter "1539"). This 1539 nylon 6/66 copolymer had a reported nylon 6 content of 85 mole %, a nylon 66 content of 15 mole %, and a copolymer melting point by DSC of about 195° C. This inventive film of Example 19 has a five layer structure which, if one refers to the Plexar resin containing layers as Adhesive (Ad) layers, may generally be identified as 100% EVA/Ad/80% EVOH:20% nylon/Ad/76.5% EVA:19.1% VLDPE: 4.4% Proc. Aid. The 100% EVA layer is the inner layer of the tubular film. This film has corresponding relative layer thicknesses of 65%/3%/3%/3%/26% where the inner layer is the thickest layer. The film of Example 19 was about 2.65 mils (67 microns) thick and had a core layer thickness of about 0.08 mil (2 microns).

For Examples 20 and 21 the inner and outer layers were identical blends of: 70.6% VLDPE (DEFD 1192); 25% EVA (DQDA 6833); and 4.4% of a processing aid. These components were described more fully above with respect to Example 19. The intermediate adhesive layers were identical blends of: 52.5% VLDPE (XU61509.32); 30% adhesive (Plexar 3779); and 17.5% EVA (DQDA 6833). This VLDPE (XU61509.32) was an ethylene-octene-1 copolymer having a reported density of 0.912 g/cm$^3$, a melt index of 0.5 dg/min., and a melting point of about 123° C., which was available from Dow Chemical Company under the trademark ATTANE XU 61509.32. The adhesive resin (Plexar 3779) is believed to be an anhydride modified ethylene-hexene-1 linear low density polyethylene copolymer which was available from Quantum Chemical Corporation under the trademark Plexar 3779. The adhesive resin had a reported melting point of about 120° C. and melt index of 0.8 dg/min.. The core layers of Examples 20 and 21 were both 80:20 weight percent blends of EVOH:nylon 6/66 copolymer. The nylon copolymer was the same one used for Example 19. The EVOH copolymer used in Example 20 had a reported ethylene content of about 44 mole percent, a melting point of about 165° C., and a melt index of 3.5 dg/min. at 210° C. and was available from Nippon Synthetic Chemical Industry Co. (hereinafter "Nippon") under the trademark Soarnol 4403. The EVOH copolymer used in Example 21 had a reported ethylene content of 38 mole percent, a melting point of about 173° C., a melt index of 8 dg/min. at 210° C., and was available from Nippon under the trademark Soarnol 3808. The films of the Examples 20 and 21 had similar layer thickness ratios to that of Example 19. Various properties of the films of Examples 19–21 were measured and are reported in Table 6 below.

TABLE 6

| EX. NO. | EVOH $C_2$ CONTENT MOLE % | AVG. GAUGE mil (micron) | TENSILE STRENGTH × $10^3$ psi at RT (mPa) | $O_2$GTR† at RT | HAZE % | GLOSS at 45° ANGLE | SHRINK at 90° % MD/TD | SHRINK at 80° C. % MD/TD |
|---|---|---|---|---|---|---|---|---|
| 19 | 48 | 1.63 (41.4) | 8.4/7.8 | 93 (60) | 1.0 | 91 | 40/49 | 25/38* |
| 20 | 44 | 2.57 (65.3) | 10.7/8.7 | 28 (69) | 6.3 | 71 | 20/37 | 11/26 |
| 21 | 38 | 2.52 (64.0) | 10.1/8.8 | 8 (71) | 6.3 | 71 | 27/38 | 17/26 |

RT = ROOM TEMPERATURE (~20–23° C.)
† = Oxygen gas transmission rate ($O_2$GTR) in units of cm$^3$ per meter$^2$ per 24 hours at 1 atmosphere and 0% relative humidity for the film tested. For $O_2$GTR film thickness is listed below the rate in microns ( ).
*Measured at 85° C.

Referring to Table 6, the oxygen permeability of each film of Examples 19–21 was controlled by the core layer for each film. Each core layer contained a blend of nylon and EVOH with the ethylene content of the EVOH varying from example to example. Example 19 of the invention (48 mole % $C_2$ content) had a high gas permeability relative to Examples 20 (44 mole % $C_2$ content) and 21 (38 mole % $C_2$ content) as shown by the room-temperature oxygen permeabilities. The carbon dioxide permeability of Example 19 would be greater than the oxygen permeability following the relationship established above in Examples 1–3 which demonstrated that $CO_2$ permeability of the inventive films are higher (generally about 4–11 times higher) than oxygen gas transmission rates under the same test conditions. Therefore, the higher oxygen permeability would indicate that the film of Example 19 may be suitably used to package a respiring foodstuff such as cheese. In contrast the films of Examples 20 and 21 had much lower oxygen permeabilities (<40 cm$^3$/m$^2$ at 24 hours, 1 atmosphere, 0% relative humidity and at room temperature) with oxygen permeability decreasing with a corresponding decrease in ethylene content. The film of Example 21 is a high barrier to oxygen while Example 20 is an oxygen barrier layer. The inventive film of Example 19 is permeable to oxygen at the stated conditions, but under refrigeration low humidity conditions would have a lower oxygen permeability while maintaining a high $CO_2$ permeability making such film well suited for packaging a respiring cheese as further shown in the following examples.

Disadvantageously, the barrier properties of films having a core layer EVOH component with an ethylene content less than 48 mole percent (or a melting point higher than 158° C.) are too great to provide the desired high $CO_2$ permeability for packaging respiring articles requiring a high $CO_2$ permeable film. However, EVOH resins having an ethylene content less than 48 mole % and as low as 38 mole % (or a melting point higher than 158° C. and as high as about 175° C.) may be blended with higher amounts of nylon polymer up to about 70% by weight nylon to produce films having sufficient permeability to package low and medium permeability $CO_2$ respiring articles such as gouda, edamer and butterkase cheeses. In addition, as shown in Table 6 the film of Example 19 has superior shrink values which are due in part to the high ethylene content EVOH which has a lower melting point relative to the EVOH copolymer used in Examples 20 and 21. The EVOH melting point of 164° C. to 173–175° C. for Examples 20 and 21, respectively, are substantially above that of PVDC which is commonly used with a plasticizer as the barrier or gas permeability controlling layer of a heat shrinkable cheese film; the vinylidene chloride copolymers melt at about 148°–150° C. The higher melting EVOH polymers are relatively stiff and inflexible at the substantially lower orientation suitable for stretch orienting of the generally lower melting components of the intermediate adhesive layers and the inner and outer layer which frequently utilize such resins as EVAs and various polyethylenes and ethylene-alpha-olefin copolymers. Therefore, the composition of the present invention may advantageously use a very thin but continuous core layer containing EVOH which is less than 10% of the total film thickness to facilitate orientation with the aforementioned polymers without requiring either excessively thick adhesive layers (>10% of the multilayer film thickness) or outer layer having a majority of their polymeric mass comprised of higher melting point polymers such as polypropylene, propylene-ethylene copolymers, and produce films having relatively high shrinkage values.

Also, Example 19 demonstrates that preferred embodiments of the invention may advantageously use a lower melting point EVOH in combination with a nylon 6/66 copolymer to facilitate orientation of a multilayer film having polymers such as EVA which may have melting points substantially lower than the melting point of the EVOH and produce films having relatively higher shrinkage values and high shrink values at lower temperatures compared to films made using EVOH polymers having melting points higher than 158° C. The film of Example 19 has excellent low temperature shrinkage values of at least 25% in either or both of the machine and transverse directions at not only 90° C., but also at 80° C. The MD/TD values of 40/49 at 90° C. are more than 25% better than the best values measured for Examples 20 and 21 which also exhibit shrinkage values of 20–30% or more at 90° C.

The inventive film of Example 19 also exhibits good tensile strength and has very good optical properties with desirably high gloss and low haze values. The inventive film had a very low haze of about 1.0% and a gloss of more than 90. Although not reported in Table 6, the puncture resistance was also measured for these films and all films had good puncture resistance indicating that these films may also be usefully employed as an industrial shrink wrap having puncture resistance.

EXAMPLES 22–27

Example 22 is a comparative Example (not of the invention) of a commercially available heat shrinkable film having high $CO_2$ permeability which is used for packaging respiring cheeses. This film was in the form of a bag and was analyzed to be a three layer structure of EVA/PVDC/EVA having individual layer thicknesses of 1.3/0.1/0.6–0.7 with the thicker EVA layer being the inner surface layer of the bag. The PVDC layer was the gas transmission (permeability) controlling layer and was plasticized to a sufficient extent that the film had a high $CO_2$ and $O_2$ permeability. Physical properties of the film were measured and are reported below in Table 7. From the results presented in table 7 it is seen that the film of Example 22 has a very high $CO_2$ permeability suitable for packaging articles requiring a high $CO_2$ permeability. Also, the shrinkage values at 90° C. and 80° C. are very good. Disadvantageously, the film optical properties are poor with a high level of haze and low gloss. A further disadvantage of this film is that it employs a chlorine-containing polymer, PVDC, which is difficult to recycle and incinerate.

Examples 23–26 were all biaxially stretched tubular, heat shrinkable films made by process similar to that used for Examples 1–3 above, however these films were not irradiated. The first outer layer which was the inner surface layer of the tube in each instance has a polymer composition which was essentially 100% EVA (DQDA 6833); the second outer layer (the outer protective surface layer of the tube) was a blend of 66% of the same EVA with 30% of a VLDPE terpolymer (DEFD 1192) and 4% of a processing aid (Ampacet 10003); the first and second adhesive layers were identical in composition and comprised a blend of: 40% EVA (6833), 30% VLDPE (1192) and 30% adhesive resin (Plexar PX169); the core layers all comprised an EVOH copolymer which was commercially available from EVALCA under the trademark G110A and had an ethylene content of 48 mole %. The core composition was varied from Example 23 to 26 by blending in nylon 6/66 copolymer (1539) to form a core layer composition having from 0 to 70 weight % nylon 6/66 copolymer. Example 23 was a comparative example (not of the invention) which had 100% EVOH (G110A)in the core layer. The core layers for Example 24 of the invention comprised 80% EVOH and 20% nylon; Example 25, 60% EVOH and 40% nylon; and Example 25, 30% EVOH and 70% nylon. All of the films were prepared having a first outer layer/adhesive layer/core layer/adhesive layer/second outer layer thickness ratio of 63/3/3/3/28. Physical properties of the unirradiated films were measured and are reported in Table 7.

TABLE 7

| EX. No. | CORE LAYER | $CO_2$GTR† at 5° C. 0% RH | $O_2$GTR† at 5° C. 0% RH | $O_2$GTR† at RT 0% RH | SHRINK at 90° C. % MD/TD | SHRINK at 80° C. % MD/TD | HAZE % | GLOSS AT 45° ANGLE |
|---|---|---|---|---|---|---|---|---|
| 22 | PVDC | 331–342 | 43 (58) | 450 (57) | 36/52 | 16/30 | 17.0 | 56 |

TABLE 7-continued

| EX. No. | CORE LAYER | $CO_2GTR$† at 5° C. 0% RH | $O_2GTR$† at 5° C. 0% RH | $O_2GTR$† at RT 0% RH | SHRINK at 90° C. % MD/TD | SHRINK at 80° C. % MD/TD | HAZE % | GLOSS AT 45° ANGLE |
|---|---|---|---|---|---|---|---|---|
| 23 | EVOH 100% | 48–53 | 7 (58) | 34 (64) | 30/44 | 12/27 | 5.2 | 76 |
| 24 | EVOH:NYLON 6/66 80:20% | 66–80 | 10 (58) | 39 (61) | 31/42 | 12/25 | 5.6 | 76 |
| 25 | EVOH:NYLON 6/66 60:40% | 131–158 | 14 (64) | 64 (61) | 32/43 | 14/23 | 5.2 | 78 |
| 26 | EVOH:NYLON 6/66 30:70% | 105–268 | 28 (58) | 171 (56) | 29/38 | 12/21 | 5.6 | 77 |
| 27 | EVOH:NYLON 11 80:20% | ND | ND | 64 (53) | 44/53 | ND | 3.8 | 82 |

ND = NOT DETERMINED
RT = ROOM TEMPERATURE (~20–23° C.)
RH = RELATIVE HUMIDITY
† Carbon dioxide gas transmission rate ($CO_2GTR$) and Oxygen gas transmission rate ($O_2GTR$) in units of $cm^3$ per $meter^2$ per 24 hours at 1 atmosphere for the film tested. For $O_2GTR$ the film thickness is below the rate in microns ( ).

The multilayer films of Example 23–26 had typical thicknesses which were between about 2.2 and 2.5 mils thick. All had good low temperature shrinkage values which were suitable for heat shrink packaging of a variety of articles at 90° C. or lower temperatures. The films also exhibited excellent optical properties with much lower haze and higher gloss than was measured for the comparative commercial PVDC-containing film of Example 22. Advantageously, all of the films of Examples 23–26 may be easily recycled, and may also be incinerated without producing chlorinated by-products. The oxygen-transmission rate for Example 23 is low at both room temperature and 5° C. indicating a good gas barrier. The $CO_2$ gas transmission rate was undesirably low for packaging $CO_2$ respiring articles. Example 24 had an oxygen permeability of about 40 $cm_3/m_2$ at room temperature, but had a $CO_2$ permeability rate which was at least about 20% or more higher than for the gas barrier film of crosslinked Example 23. As previously shown in Examples 1–3 (which were irradiated) as more nylon is blended into the EVOH copolymer, the $CO_2$ and $O_2$ permeability may be adjusted providing greater gas permeation. Advantageously, addition of nylon greatly increases the $CO_2$ permeability relative to the increase in oxygen permeability. This is due in at least part to the permeability of EVOH to $CO_2$ being much greater than the permeability EVOH to oxygen. Therefore, permeabilities to $CO_2$ may be significantly increased while maintaining relatively low levels of $O_2$ permeability. In other words if you multiply low and high numbers by the same factor a greater numerical change is seen in the larger number. Thus the difference in permeability rates is much larger for blends of EVOH: nylon having large amounts of nylon than smaller amounts. Examples 24–26 of the invention all had $O_2GTR$ values which were at least 10 $cm^3/m^2$ at 5° C., 0% relative humidity, 1 atmosphere, at 24 hours, and the corresponding $O_2GTR$ Values at room temperature (about 20–23° C.) were 39 $cm^3/m^2$ (about 40 $cm^3/m^2$) or higher.

Referring now to Example 27, a five layer multilayer, tubular, heat shrinkable, nonirradiated film was made as described above with respect to Examples 23–26. The first outer layer (inner surface layer of the tube) was comprised of EVA (6833) while the second outer layer comprised about 74% of a first EVA having a vinyl acetate content of about 12 mole percent, a density of about 0.94 $g/cm^3$, and melt index of about 0.35 dg/min. which was commercially available from DuPont under the trademark Elvax 3135X blended with about 23.5% of a second EVA having a vinyl acetate content of about 4.5 mole percent, a density of about 0.93 $g/cm^3$, a melt index of about 0.25 dg/min. which was commercially available from Quantum under the trademark NA 3507 and further blended with about 2.5% of a processing aid (Ampacet 100031). The adhesive layers were identical and comprised a blend of 70% VLDPE (1192) with 30% by weight of an adhesive resin which is believed to be an anhydride modified butene-1 based LLDPE having a melt index of about 1.5 dg/10 min. at 190° C., and a melting point of about 120° C. This adhesive resin was commercially available from Quantum Corp. under the trademark Plexar 3741. The core layer comprised a blend of 80% by weight of an EVOH (EVALCA G115) having an ethylene content of about 48 mole percent, a melt index of 14.0 dg/min., and a melting point of 158° C. with 20% of a nylon 11 having a reported density of about 1.04 $g/cm^3$ which was commercially available under the trademark Besno from Rilsan Corp. now believe to be Atochem North America, Inc. of Philadelphia, Pa., USA.

Physical properties of this film were measured and are reported in Table 7 above. The film is seen to provide an oxygen permeability at room temperature which indicates that the film should have good $CO_2$ gas transmission rates suitable for packaging high gassing respiring articles. The measured optical property of haze was desirably low and the film had good gloss. However, visual inspection of the film indicated visible streaks and lines which detracted from the film appearance. Such film of Example 27 is workable, but does not have the same excellent appearance obtained with films of the invention which utilize nylon 6/66 copolymer.

Films, bags and packages of the present invention may also employ combinations of characteristics as described in one or more of the claims including dependent claims which follow this specification and where not mutually exclusive, the characteristics and limitations of each claim may be combined with characteristics or limitations of any of the other claims to further describe the invention.

The above examples serve only to illustrate the invention and its advantages, and they should not be interpreted as limiting since further modifications of the disclosed invention will be apparent to those skilled in the art in view of this teaching. All such modifications are deemed to be within the scope of the invention as defined by the following claims.

What is claimed is:

1. A packaged cheese comprising a cheese encased in a multilayer film having a thickness of less than 10 mils having in contact with said cheese an inner food contact layer, said multilayer film further comprising: an outer protective layer; first and second adhesive layers; and a core layer having a thickness between about 0.05 to less than 0.10 mils (1.27–2.54 microns); said core layer comprising a blend of about 20–70 weight percent of nylon and about 30–80 weight percent of an ethylene vinyl alcohol copolymer having an ethylene content of about 38 mole percent or higher, wherein said core layer is between said first and second adhesive layers with (1) said first adhesive layer being adhered to a first surface of said core layer, said first adhesive layer being located between said inner food contact layer and said core layer, and (2) said second adhesive layer being adhered to an opposing second surface of said core layer, said second of adhesive layer being located between said outer protective layer and said core layer.

2. A packaged cheese, as defined in claim 1, wherein at least one of said inner and outer layers is crosslinked.

3. A packaged cheese, as defined as in claim 1, wherein at least one layer of said film is irradiated.

4. A packaged cheese, as defined in claim 1, wherein said entire film is a biaxially stretched film, said entire film being irradiated after biaxial stretching.

5. A packaged cheese, as defined in claim 1, whereas said cheese is Emmental cheese.

6. A packaged cheese, as defined in claim 1, wherein said cheese is a natural cheese containing a starter culture of a $CO_2$ producing bacteria.

7. A packaged cheese, as defined in claim 1, wherein said cheese is Gouda.

8. A packaged cheese, as defined in claim 1, wherein said cheese is Edam.

9. A packaged cheese as in claim 1 wherein said ethylene content of said ethylene vinyl alcohol copolymer is at least 48 mole percent or higher.

10. A packaged cheese as in claim 1 wherein said ethylene content of said ethylene vinyl alcohol copolymer is about 48 mole percent.

11. A packaged cheese as in claim 1 wherein said nylon is nylon 6/66 copolymer.

12. A packaged cheese as in claim 1 wherein said nylon is nylon 11.

13. A packaged cheese, as defined in claim 1, wherein said film has a shrinkage value of at least 15% at 90° C. in at least one direction.

14. A packaged cheese, as defined in claim 1, wherein at least one of said inner food contact layer and said outer protective layer comprises polypropylene, a propylene ethylene copolymer, ionomer, nylon, polyethylene, an ethylene vinyl ester, a polyolefin, a LLDPE, an LMDPE, a LDPE, an HDPE, an elastomer, a plastomer, or blends of one or more thereof.

15. A packaged cheese, as defined in claim 1, wherein said film has a $CO_2$ gas transmission rate of at least 100 $cm^3/m^2$ at 24 hours at 1 atmosphere, 0% relative humidity at 5° C.

16. A packaged cheese, as defined in claim 15, wherein said film has an $O^2$ gas transmission rate of 10 $cm^3/m^2$ or higher at 24 hours, 1 atmosphere, 0% relative humidity and 5° C.

17. A packaged cheese, as defined in claim 1, wherein said film has a $CO_2$GTR of at least 250 $cm^3/m^2$ at 1 atmosphere, at 20° C. and 0% relative humidity.

18. A packaged cheese, as defined in claim 1, wherein said EVOH copolymer has a melting point of about 158° C. or less.

19. A packaged cheese, as defined in claim 1, wherein said EVOH copolymer is present in said blend in an amount of about 30 to less than 50 weight percent.

20. A packaged cheese product comprising a $CO_2$ respiring cheese product encased in a multilayer thermoplastic film having at least five layers which comprise:

(a) a heat sealing layer comprising a polyolefin, an etheylene alpha-olefin copolymer, a propylene ethylene copolymer, polypropylene, ionomer, nylon, an ethylene vinyl ester copolymer, an ethylene acrylic acid copolymer, or blends of one or more thereof;

(b) a first adhesive layer;

(c) a core layer comprising a blend of from about 20 to 70% by weight nylon and from 30 to 80% ethylene-vinyl alcohol copolymer;

(d) a second adhesive layer; and (e) an outer protective layer, wherein said film has a permeability of $CO_2$ greater than its permeability to $O_2$, and wherein said core layer has a thickness less than 0.10 mil.

21. A packaged cheese, as defined in claim 20, wherein said core layer consists essentially of a blend of ethylene vinyl alcohol copolymer and nylon.

22. A packaged cheese product, as defined in claim 20, wherein said heat sealing layer comprises an ethylene alpha-olefin copolymer having a density less than 0.915 $g/cm^3$.

23. A packaged cheese, as defined in claim 20, wherein said $CO_2$ permeability is at least 4 times higher than the $O_2$ permeability.

24. A packaged cheese, as defined in claim 20, wherein at least one layer of said film has been irradiatively crosslinked.

25. A packaged cheese, as defined in claim 20, wherein film is biaxially stretched, oriented film.

26. A cheese multilayer film comprising a multilayer thermoplastic film having at least five layers which comprises:

(a) a heat sealing layer comprising a polyolefin, an ethylene alpha-olefin copolymer, a propylene ethylene copolymer, polypropylene, ionomer, nylon, an ethylene vinyl ester copolymer, an ethylene acrylic acid copolymer, or blends of one or more thereof;

(b) a first adhesive layer;

(c) a core layer comprising a blend of from about 20 to 70% by weight nylon and from 30 to 80% ethylene-vinyl alcohol copolymer;

(d) a second adhesiver layer; and (e) an outer protective layer, wherein said film has a permeability of $CO_2$ greater than its permeability to $O_2$, and wherein said core layer has a thickness less than 0.10 mil.

27. A film, as defined in claim 26, wherein said core layer consists essentially of a blend of ethylene vinyl alcohol copolymer and nylon.

28. A film, as defined in claim 26, wherein said heat sealing layer comprises an ethylene alpha-olefin copolymer having a density less than 0.915 $g/cm^3$.

29. A film, as defined in claim 26, wherein said $CO_2$ permeability is at least 4 times higher than the $O_2$ permeability.

30. A film, as defined in claim 26, wherein at least one layer of said film has been irradiatively crosslinked.

31. A film, as defined in claim 26, wherein said film is heat shrinkable at 90° C.

32. A film, as defined in claim 31, wherein at least one of said heat sealing layer and said outer protective layer comprises polypropylene or a propylene ethylene copolymer or blends thereof.

33. A film, as defined in claim 31, wherein said heat sealing layer and said outer protective layer each comprise polyproplene or a propylene ethylene copolymer or blends thereof.

34. A film, as defined in claim 31, wherein said $O_2$ permeability is at least 500 and less than 800 $cm^3/m^2$ at 24 hours, 1 atmosphere, 0% relative humidity, at 23° C.

35. A film, as defined in claim 34, wherein said $CO_2$ permeability is at least 900 $cm^3/m^2$ at 24 hours, 1 atmosphere, 0% relative humidity, at 23° C.

* * * * *